US010400911B2

(12) United States Patent
Gilbert

(10) Patent No.: US 10,400,911 B2
(45) Date of Patent: Sep. 3, 2019

(54) IN-LINE FLUID PRESSURE REGULATOR

(71) Applicant: Sensata Technologies, Inc., Attleboro, MA (US)

(72) Inventor: Major H. Gilbert, Gladys, VA (US)

(73) Assignee: Sensata Technologies, Inc., Attleboro, MA (US)

( * ) Notice: Subject to any disclaimer, the term of this patent is extended or adjusted under 35 U.S.C. 154(b) by 63 days.

(21) Appl. No.: 15/827,265

(22) Filed: Nov. 30, 2017

(65) Prior Publication Data

US 2019/0162328 A1    May 30, 2019

(51) Int. Cl.
*F16K 1/12* (2006.01)
*F16K 1/52* (2006.01)
(Continued)

(52) U.S. Cl.
CPC ............ *F16K 31/365* (2013.01); *F02M 69/54* (2013.01); *F16K 1/126* (2013.01); *F16K 1/523* (2013.01);
(Continued)

(58) Field of Classification Search
CPC .... F16K 31/365; F16K 15/025; F16K 15/026; F16K 15/063; F16K 17/04; F16K 17/06;
(Continued)

(56) References Cited

U.S. PATENT DOCUMENTS

| 1,333,506 A | * | 3/1920 | Perry | ...................... F16K 21/04 251/322 |
| 1,333,897 A | * | 3/1920 | Bringman | ............. H01T 13/467 123/169 EL |

(Continued)

FOREIGN PATENT DOCUMENTS

| CN | 204358191 | 5/2015 |
| FR | 2795801 | 1/2001 |
| WO | 2016/042895 | 3/2016 |

OTHER PUBLICATIONS

UK Search Report for UK Patent Application No. GB1818751.8, dated Apr. 15, 2019, 5 pages.

*Primary Examiner* — Mary E McManmon
*Assistant Examiner* — Frederick D Soski
(74) *Attorney, Agent, or Firm* — Burns & Levinson, LLP; Joseph M. Maraia; Richard B. Emmons

(57) ABSTRACT

The present disclosure relates to pressure relief and pressure regulating valves. More particularly, the disclosure relates to a miniature in-line fuel pressure regulator having a regulator body that includes a housing member and an adjusting member, a pin axially disposed within the regulator body, the pin including an upper end having a circumferential groove, a lower end having a fluid inlet, one or more fluid discharge ports, and a fluid passageway connecting the fluid inlet to the one or more fluid discharge ports, an elastomeric O-ring conformingly positioned within the circumferential groove on the upper end of the pin so that the elastomeric O-ring contacts the raised annular valve seat when the fluid pressure regulator is closed, and a biasing member coupled to the pin and configured to maintain the elastomeric O-ring in contact with the raised annular valve seat to control an opening pressure of the fluid pressure regulator.

14 Claims, 21 Drawing Sheets

(51) Int. Cl.
*F16K 15/02* (2006.01)
*F02M 69/54* (2006.01)
*F16K 31/365* (2006.01)

(52) U.S. Cl.
CPC .... *F16K 15/026* (2013.01); *F17C 2205/0332* (2013.01); *F17C 2205/0338* (2013.01); *F17C 2205/0391* (2013.01)

(58) Field of Classification Search
CPC ... F16K 1/12; F16K 1/126; F16K 1/52; F16K 1/523; F02M 69/54; F17C 2205/0332; F17C 2205/0335; F17C 2205/0338; F17C 2205/0391; F01L 3/08; F01L 3/10; Y10T 137/7929; Y10T 137/7744; Y10T 137/7839; Y10T 137/7931
USPC .................................................. 251/159, 322
See application file for complete search history.

(56) References Cited

U.S. PATENT DOCUMENTS

| | | | | |
|---|---|---|---|---|
| 1,338,186 A | * | 4/1920 | McGrother | F01L 3/08 123/90.33 |
| 1,338,838 A | * | 5/1920 | Niles | F01L 1/047 123/188.9 |
| 1,344,347 A | * | 6/1920 | Lee | F01L 3/08 123/188.6 |
| 1,353,415 A | * | 9/1920 | Newsom | F16K 15/20 137/232 |
| 1,378,218 A | * | 5/1921 | Cooke | F16K 21/04 251/322 |
| 1,378,426 A | * | 5/1921 | Sackett | F16K 21/04 251/322 |
| 1,381,795 A | * | 6/1921 | Carson | B60R 17/00 251/293 |
| 1,554,659 A | * | 9/1925 | Rudolph | F01L 3/10 251/322 |
| 1,595,317 A | * | 8/1926 | Scholey | F01L 1/462 123/90.65 |
| 1,605,399 A | * | 11/1926 | Fornaca | F01L 1/462 123/90.65 |
| 1,630,666 A | * | 5/1927 | McEvoy, Jr. | E21B 34/06 137/512.1 |
| 1,640,118 A | * | 8/1927 | Ford | F01L 3/10 123/90.67 |
| 1,671,111 A | * | 5/1928 | Hayes | F01L 1/12 123/188.9 |
| 1,706,263 A | * | 3/1929 | Taylor | F01L 1/20 251/322 |
| 1,711,267 A | * | 4/1929 | Hutt | F01L 3/08 123/90.37 |
| 1,833,653 A | * | 11/1931 | Martin | F16K 31/44 137/601.15 |
| 1,873,569 A | * | 8/1932 | Ford | F01L 3/00 123/188.2 |
| 1,894,859 A | * | 1/1933 | Gabel | F01L 3/08 123/188.6 |
| 1,939,516 A | * | 12/1933 | Olson | A46B 11/0013 251/322 |
| 1,945,834 A | * | 2/1934 | Terry | G05D 16/0663 137/454.5 |
| 1,977,571 A | * | 10/1934 | Brumm | F24C 5/18 119/77 |
| 2,009,575 A | * | 7/1935 | Card, Jr. | F16K 21/04 12/36.5 |
| 2,015,158 A | * | 9/1935 | Rosenberg | B67B 7/26 215/3 |
| 2,177,779 A | * | 10/1939 | McDonald | F23D 11/24 137/454.5 |
| 2,181,653 A | * | 11/1939 | Clauder | A45D 19/00 137/340 |
| 2,181,758 A | * | 11/1939 | Goon | F16L 29/02 137/359 |
| 2,194,850 A | * | 3/1940 | Goff | F16K 15/20 137/223 |
| 2,197,352 A | * | 4/1940 | Terkel | B67D 3/044 137/588 |
| 2,367,106 A | * | 1/1945 | Dolch | F16K 47/12 137/508 |
| 2,405,241 A | * | 8/1946 | Smith | E03C 1/295 137/526 |
| 2,552,637 A | * | 5/1951 | McCallum | E21B 21/01 137/540 |
| 2,597,169 A | * | 5/1952 | Nowak | B30B 1/007 100/231 |
| 2,628,062 A | * | 2/1953 | Weber | F16K 21/04 137/375 |
| 2,645,242 A | * | 7/1953 | Monnich | F16K 15/063 137/493.9 |
| 2,653,587 A | * | 9/1953 | Rasmussen | F01L 1/32 123/90.29 |
| 2,658,492 A | * | 11/1953 | Taylor | F01L 1/20 123/188.9 |
| 2,670,922 A | * | 3/1954 | Carlisle | F16K 15/026 137/540 |
| 2,764,324 A | * | 9/1956 | Landreth | B67D 3/0009 222/501 |
| 2,821,991 A | * | 2/1958 | Marx | F16K 17/38 137/541 |
| 2,963,259 A | * | 12/1960 | Heyer | F16K 21/16 137/454.2 |
| 3,208,720 A | * | 9/1965 | Huntington | F16K 1/46 137/625.27 |
| 3,220,695 A | * | 11/1965 | Jones | E03C 1/23 251/230 |
| 3,389,886 A | * | 6/1968 | Tissot-Dupont | F16K 31/363 137/474 |
| 3,730,224 A | * | 5/1973 | Prisk | F16K 1/32 137/625.33 |
| 3,800,825 A | * | 4/1974 | Zoll | A01K 7/06 119/72.5 |
| 4,014,365 A | * | 3/1977 | Peterson | A01K 7/06 119/75 |
| 4,059,017 A | * | 11/1977 | Settlemyer | F16K 17/04 137/540 |
| 4,080,988 A | * | 3/1978 | Robertson | F16K 15/026 137/513.3 |
| 4,428,396 A | * | 1/1984 | Wall | F16K 17/18 137/493 |
| 4,561,466 A | * | 12/1985 | Fassbinder | C21C 5/48 137/536 |
| 4,930,689 A | * | 6/1990 | Stumpf | B67D 3/043 137/588 |
| 4,989,832 A | * | 2/1991 | Kremer | F16K 1/302 222/509 |
| 4,993,376 A | * | 2/1991 | Fukutome | F01L 1/462 123/90.65 |
| 4,995,588 A | * | 2/1991 | Nichols | B67D 7/0294 251/144 |
| 6,244,253 B1 | | 6/2001 | Haeberer et al. | |
| 6,877,525 B2 | * | 4/2005 | Fischer | F16K 1/12 137/538 |
| 6,994,108 B2 | * | 2/2006 | Roth | F02M 55/001 137/541 |
| 8,485,801 B2 | * | 7/2013 | Mohamed | F01L 3/085 417/569 |
| 9,702,472 B2 | * | 7/2017 | Burgett | F16K 24/04 |
| 9,822,884 B2 | * | 11/2017 | Miyake | F17C 13/04 |
| 10,086,166 B1 | * | 10/2018 | Nashed | A61M 16/208 |
| 2005/0082508 A1 | * | 4/2005 | Dziob | F16K 1/12 251/323 |
| 2011/0108130 A1 | * | 5/2011 | Schultz | F02M 37/0029 137/14 |
| 2016/0116918 A1 | * | 4/2016 | Nakamura | G05D 7/00 137/544 |
| 2018/0195630 A1 | * | 7/2018 | Lammers | F16K 17/383 |

* cited by examiner

IN-LINE FLUID PRESSURE REGULATOR

TECHNICAL FIELD

The disclosure relates to pressure relief and pressure regulating valves. More particularly, the disclosure relates to a miniature in-line fluid pressure regulator valve having one or more flow channels that have been optimized to minimize pressure increases with increasing fuel flow rates.

BACKGROUND

Internal combustion fuel injection systems typically require some form of pressure controlling device (e.g., a pressure regulator or a pressure relief valve) to maintain an appropriate fuel pressure at the fuel injectors. Conventional fuel pressure regulators may have elastomeric diaphragms, or molded seals in their devices. Such conventional fuel pressure regulators are generally able to maintain reasonable pressure integrity with a good pressure gradient. For example, a conventional 350 kPa@ 20 LPH regulator may exhibit a pressure gradient of 0.18 kPa/LPH between 20 LPH and 250 LPH flow rate, and flow rates up to 400 LPH may be achieved with no indication of flow rate limitation. Disadvantageously, conventional fuel pressure regulators display significantly increased pressure drops at low flow rates because compression of the fuel regulator seal by the housing seal surface causes a turbulent flow path, which functions to increase the pressure drop. Additionally, conventional pressure regulators are too large and too expensive for most small engine applications.

SUMMARY

The present disclosure provides a fluid pressure regulator having a regulator body, a pin axially disposed within the regulator body, the pin including an upper end having a circumferential groove, a lower end having a fluid inlet, one or more fluid discharge ports, and a fluid passageway connecting the fluid inlet to the one or more fluid discharge ports, an elastomeric O-ring conformingly positioned within the circumferential groove on the upper end of the pin, wherein the elastomeric O-ring contacts the raised annular valve seat when the fluid pressure regulator is closed, and a biasing member coupled to the pin and configured to maintain the elastomeric O-ring in contact with the raised annular valve seat and to control an opening pressure of the fluid pressure regulator may function to minimize pressure increases in the pressure regulator as fuel flow rates increase. Advantageously, the present disclosure provides a pressure regulator design that allows for the miniaturization of an in-line fuel pressure regulator that may be adjusted to meet various set points (e.g., kPa/LPH). Additionally, the techniques herein allow the disclosed pressure regulator to be assembled, calibrated, and tested in an automatic assembly process that allows production at a lower cost point then current prior art methodologies, while also reducing the size of the pressure regulator to meet the needs of the small engine market in a cost-efficient manner.

In one aspect a fluid pressure regulator according to an exemplary embodiment of the disclosure may include a regulator body having a housing member and an adjusting member, the housing member including a lower end and an upper end having a raised annular valve seat surrounding a fluid outlet, and the adjusting member having a lower end and an upper end configured to adjustably mate with the lower end of the housing member. The fluid pressure regulator also includes a pin axially disposed within the regulator body, the pin including an upper end having a circumferential groove, a lower end having a fluid inlet, one or more fluid discharge ports, and a fluid passageway connecting the fluid inlet to the one or more fluid discharge ports, an elastomeric O-ring conformingly positioned within the circumferential groove on the upper end of the pin, wherein the elastomeric O-ring contacts the raised annular valve seat when the fluid pressure regulator is closed; and a biasing member coupled to the pin and configured to maintain the elastomeric O-ring in contact with the raised annular valve seat and to control an opening pressure of the fluid pressure regulator.

In an embodiment, the one or more fluid discharge ports are positioned proximal to the circumferential groove on the pin. In an embodiment, the one or more fluid discharge ports are a first discharge port and a second discharge port. In an embodiment, the first discharge port is positioned on the side of the pin opposite from the second discharge port. In an embodiment, the first discharge port provides a larger aperture than the second discharge port.

In an embodiment, the fluid outlet is centrally positioned on the upper end of the housing member.

In an embodiment, the biasing member comprises a spring having a first end and a second end, the first end configured to contact an annular seat on the upper end of the adjusting member and the second end configured to contact an annular shelf on the pin.

In an embodiment, the elastomeric O-ring has a radius ranging from about 0.68 inches to about 0.74 inches. In an embodiment, the elastomeric O-ring is made of a fluoroelastomer or any elastomer that is compatible with the fuel being handled may be used.

In an embodiment, the upper and of the adjusting member includes an external threaded surface configured to mate with an internal threaded surface of the lower end of the housing member.

In an embodiment, the opening pressure of the fluid pressure regulator is changed by rotating the adjusting member clockwise or counterclockwise relative to the housing member.

In an embodiment, a fluid in the fluid passageway is at a pressure ranging from about 15 to about 200 L per hour.

In an embodiment, the housing member is made of a material selected from the group consisting of brass, NP, and stainless steel, and the adjusting member is made of a material selected from the group consisting of brass, NP, and stainless steel.

In an embodiment, the fluid pressure regulator regulates the pressure of a fluid selected from the group consisting of ethanol, methanol, gasoline, diesel, biodiesel, and mixtures thereof.

In one aspect, the present disclosure provides a method of regulating fluid pressure that includes the following steps: providing a fluid passageway in a fluid pressure regulator that connects a fluid inlet to one or more fluid discharge ports; coupling the fluid passageway to a biasing member configured to move the one or more fluid discharge ports between a closed position in which the one or more fluid discharge ports are not in fluid communication with a fluid outlet on the fluid pressure regulator and a second position in which the one or more fluid discharge ports are in fluid communication with the fluid outlet; and controlling, based on a level of biasing of the biasing member, a flow of fluid through the fluid pressure regulator.

BRIEF DESCRIPTION OF THE DRAWINGS

The following detailed description, given by way of example, but not intended to limit the disclosure solely to the specific embodiments described, may best be understood in conjunction with the accompanying drawings, in which.

DETAILED DESCRIPTION

Figure 1:
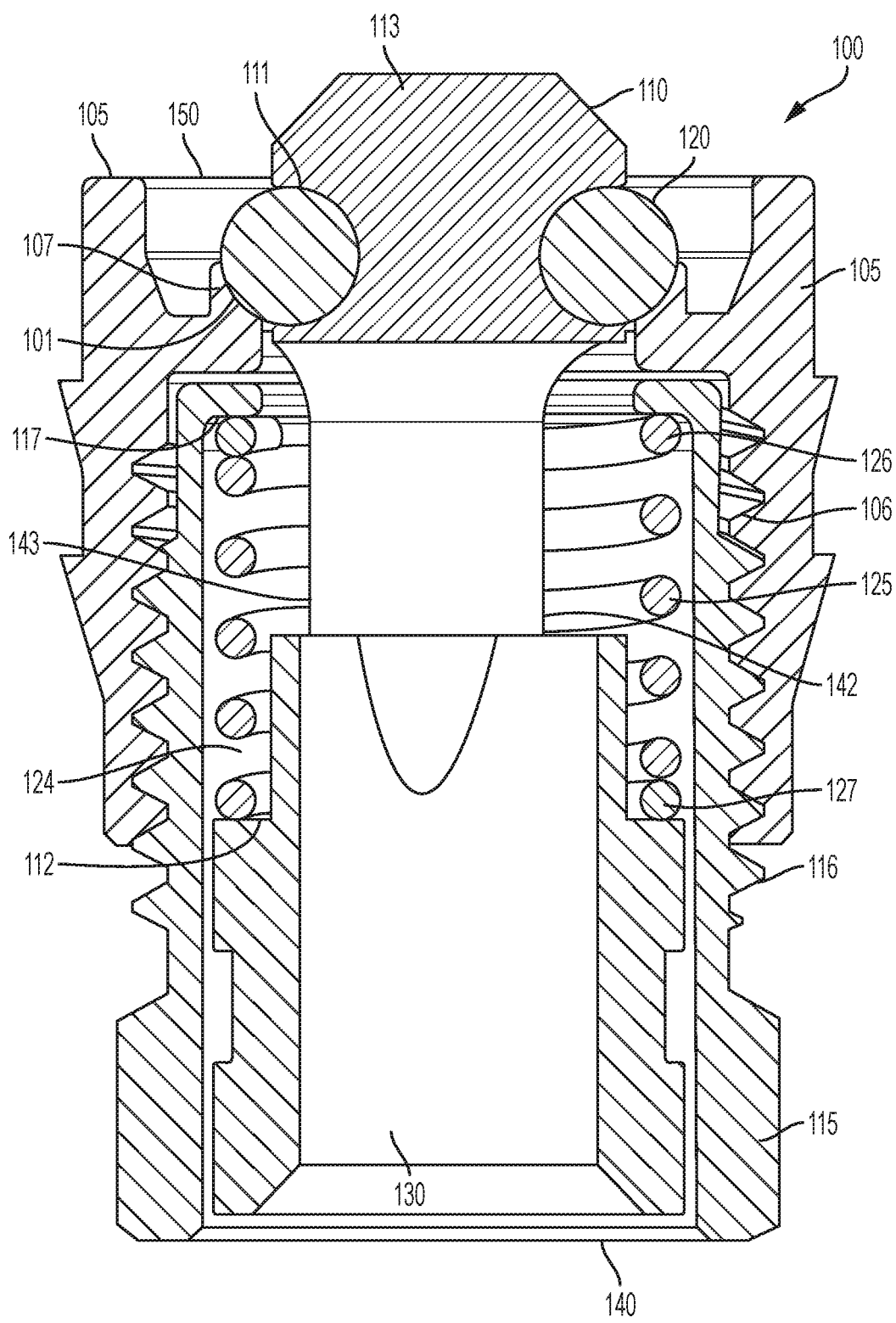
FIG. 1 shows a cross-sectional view of a fluid pressure regulator according to an exemplary embodiment of the disclosure.

The present disclosure is based, at least in part, on the realization that a fluid pressure regulator having a regulator body, a pin axially disposed within the regulator body, the pin including an upper end having a circumferential groove, a lower end having a fluid inlet, one or more fluid discharge ports, and a fluid passageway connecting the fluid inlet to the one or more fluid discharge ports, an elastomeric O-ring conformingly positioned within the circumferential groove on the upper end of the pin, wherein the elastomeric O-ring contacts the raised annular valve seat when the fluid pressure regulator is closed, and a biasing member coupled to the pin and configured to maintain the elastomeric O-ring in contact with the raised annular valve seat and to control an opening pressure of the fluid pressure regulator may function to minimize pressure increases in the pressure regulator as fuel flow rates increase. In particular, the present disclosure provides a pressure regulator design that allows for the miniaturization of an in-line fuel pressure regulator that may be adjusted to meet various set points (e.g., kPa/LPH). Additionally, the techniques herein allow the disclosed pressure regulator to be assembled, calibrated, and tested in an automatic assembly process that allows mass production at a lower cost point then current prior art methodologies, while also reducing the size of the pressure regulator to meet the needs of the small engine market in a cost-efficient manner.

Where applicable or not specifically disclaimed, any one of the embodiments described herein are contemplated to be able to combine with any other one or more embodiments, even though the embodiments are described under different aspects of the disclosure. These and other embodiments are disclosed and/or encompassed by, the following detailed description.

The requirements for fuel system performance have increased over recent years, placing increased demands on fuel system components within such fuel systems. For example, hybrid vehicles that use stop-start engine technology must maintain fuel pressure at the fuel injectors during the engine-off period, otherwise engine restart will suffer. Additionally, such fuel systems frequently employ high pressure pulsation from a high pressure fuel pump, which has the significant downside of subjecting fuel system components (e.g., fuel pressure regulators) to tremendous fatigue stress.

Changes in fuel systems of evolving internal combustion engines are driving a re-examination of the capability of pressure regulators. Excellent pressure regulation, with a low and predictable pressure gradient, remains important in many applications. For example, start-stop engine technologies place a premium on pressure integrity, and the pressure pulsation generated back to the regulator by a high pressure pump in direct injection systems places severe mechanical stresses on the pressure regulator. Additionally, the various types of fuels that are in use in the current global market add additional environmental stresses that must be accommodated by fuel pressure regulators.

The techniques herein provide a new fuel pressure regulator having a "straight-through" or "in-line" fluid flow design that combines elastomeric O-ring sealing technology with one or more fuel flow channels that have been optimized to minimize pressure increases with increasing fuel flow rates. The O-ring elastomeric sealing technology has been engineered for extremely reliable sealing and robustness against the mechanical stresses created in modern fuel systems.

In particular, the present disclosure provides a miniature in-line fluid pressure regulator valve having a regulator body that may include an upper housing member having a fluid outlet and a lower adjusting member, a pin axially disposed within the regulator body, the pin including an upper end having a circumferential groove, a lower end having a fluid inlet, one or more fluid discharge ports, and a fluid passageway connecting the fluid inlet to the one or more fluid discharge ports, an elastomeric O-ring conformingly positioned within the circumferential groove on the upper end of the pin so that the elastomeric O-ring contacts the raised annular valve seat when the fluid pressure regulator is in a closed position, and a biasing member coupled to the pin and configured to maintain the elastomeric O-ring in contact with the raised annular valve seat when the fluid pressure regulator is in a closed position, while also controlling the fluid pressure required to open the fluid pressure regulator.

The plastic pin may be biased via the biasing member to maintain the elastomeric O-ring seal in contact with the tapered seat on the upper portion to maintain the valve in a closed position when the pressure of a fluid within the fluid passageway is too low. As the pressure of the fluid within the fluid passageway increases past a threshold point of the biasing member, the biasing member may be compressed so as to place the one or more fluid discharge ports in fluid communication with the fluid outlet of the housing member of the regulator body, thereby allowing a fluid (e.g., fuel) to pass freely through the fluid pressure regulator.

Flow of fluid through and out of the pressure regulator valve housing may optionally be controlled through an adjustment feature (i.e. the adjusting member) that modulates the threshold point of the biasing member (e.g., by increasing or decreasing the tension of a spring) with respect to its response to the pressure of a fluid within the fluid passageway. It is also contemplated within the scope of the disclosure that the biasing member may be pre-set, for example, by pre-setting the installed height of the spring seat on the lower portion of the pin relative to an upper spring seat on the housing member to accommodate various fuel flow pressure and/or flow rate requirements. This adjustment feature may be pre-set, or post-set, depending on the application. Typically, to direct more fuel to the engine, the pressure of the fuel supply may be increased along with the volume of delivery that can be adjusted for any particular requirement. The relative size of this pressure regulator suits it for automotive, as well as non-automotive small engine applications.

FIG. 1 shows a cross-sectional view of an exemplary embodiment of pressure regulator 100, which is primarily composed of valve housing 105, valve pin 110, adjusting screw 115, O-ring 120, and biasing member 125 (e.g., a spring). Valve pin 110 is disposed within valve housing 105 and adjusting screw 115, which is partially disposed within, and configured to mate with, valve housing 105. Valve pin 110 includes O-ring groove 111, which is circumferentially positioned around valve pin head 113 and configured to seat O-ring 120. Valve housing 105 includes valve housing thread 106 and valve seat 107. Adjusting screw 115 includes adjusting screw thread 116 which may be configured to adjustably mate with valve housing thread 106 of valve housing 105. When adjusting screw 115 is mated to valve housing 105, the combined unit may be referred to as a regulator body. When mated with valve pin head 113, O-ring 120 functions as a seal 101 as it contacts valve seat 107 on valve housing 105 when pressure regulator 100 is in the closed position (as shown in FIG. 1). O-ring 120 may also function to provide suitable counter pressure to biasing member 125 which may hold valve pin 110 in place within the regulator body.

Biasing member 125, disposed in bore 124 of adjusting screw 115, has a first end 126 positioned in proximity to upper biasing member seat 117 on adjusting screw 115, and a second end 127 positioned in proximity to lower biasing member seat 112 of valve pin 110. Biasing member 125 biases valve pin 110 to maintain O-ring 111 in contact with seat 107 to maintain valve 100 in a closed position until fuel pressure on the biasing member side of pin 110, such as in fluid passage 130, overcomes tension in biasing member 125 and allows valve pin 110 to move into an open position. Adjusting screw 115, or a similar mechanism, which may be disposed in valve housing 105, may be used to adjust the level of biasing provided by biasing member 125. For example, during assembly or manufacture of pressure regulator 100, adjusting screw 115 may be turned either clockwise or counterclockwise to adjust the tension on biasing member 125 to meet a desired set point (kPa/LPH) to allow valve pin 110 to move into an open position.

According to the techniques herein, the opening pressure of pressure regulator 100 may be calibrated and/or adjusted by modifying the axial position of biasing member 125 with respect to the relative distance between second biasing member end 127 and first biasing member end 126 until the proper or desired biasing force is applied to pin 110 so as to balance a desired fluid pressure below seal 101, which then provides the proper or desired opening pressure for pressure regulator 100. Once the correct position of second biasing member end 127 relative to first biasing member end 126 is achieved, the position of adjusting screw 115 may be locked into place. For example, an upsetting tool or the like might may be used to lock the threads between adjusting screw 115 and valve housing 105. However, it is contemplated within the scope of the disclosure that other arrangements known to one of skill in the art, such as a mechanical lock or adjustable pin, may also be used.

Valve pin 110 includes fluid passage 130, which is fluidly connected to inlet 140 on a lower end and both first discharge port 142 and second discharge port 143 on an upper end. Valve housing 105 further provides outlet 150, which connects to fluid passage 130 via first discharge port 142 and/or second discharge port 143 when pressure regulator 100 is in the open position, thereby connecting outlet 150 to inlet 140 and allowing a fluid to flow through the pressure regulator 100. In this manner, pressure regulator 100 may function as an "in-line" valve.

Bore 124 operatively accommodates valve pin 110 and constrains the length of valve biasing member 125. Preferably, valve pin 110 is contained axially in bore 124 of adjusting screw 115. Valve housing 105 and/or adjusting screw 115 may be made of brass, optionally plated with nickel, fuel grade plastics (e.g., FEP, TFE, PFA, ECTFE, ETFE, PVDF, etc.) or the like. However, most any non-corrosive metal, or other metal with an anti-corrosive coating, can be employed for housing 105. Alternatively, plastic construction, using moisture and fuel resistant plastics may be used. The O-ring may typically be made from Fluoroelastomer (FKM) rubber, but any rubber that is compatible with the fuel being handled may be used.

Figure 2A:
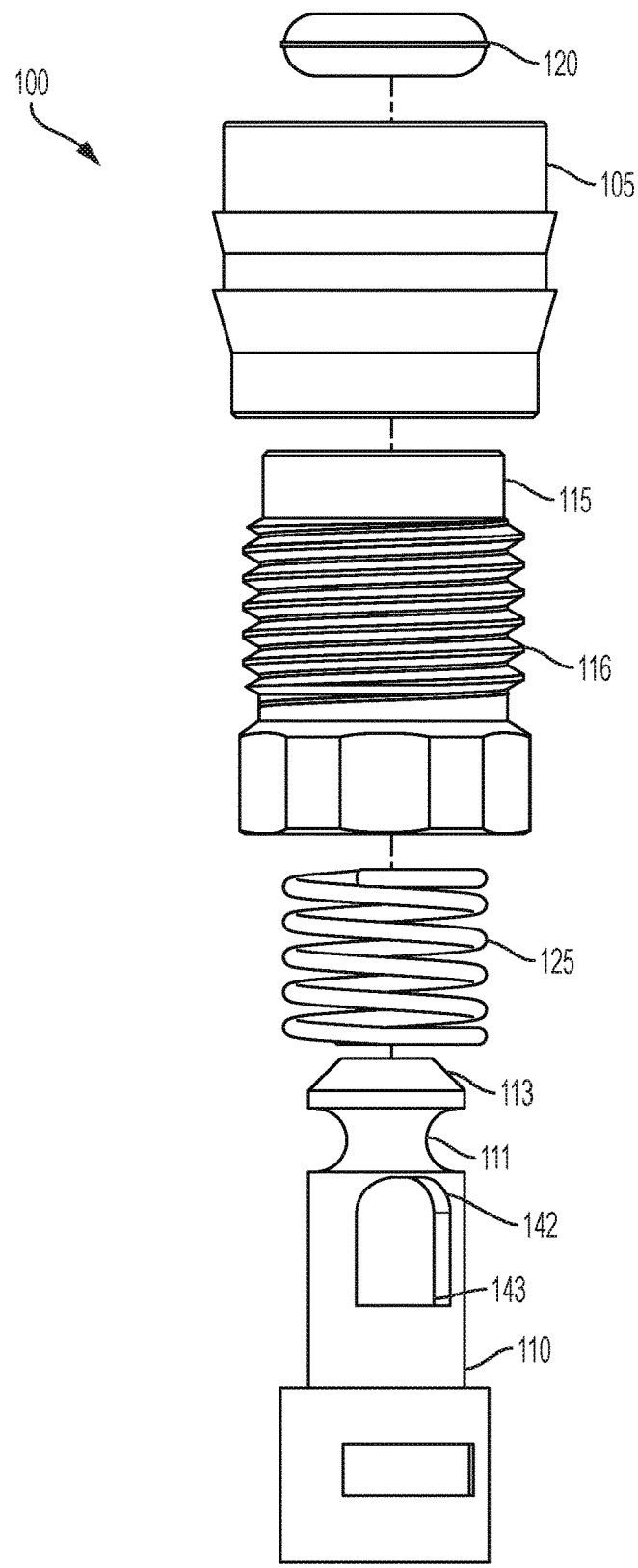
FIGS. 2A-2B show exploded views of a fluid pressure regulator according to an exemplary embodiment of the disclosure in which a valve pin is shown in either a front view (FIG. 2A) or a side view (FIG. 2B)
Figure 2B:
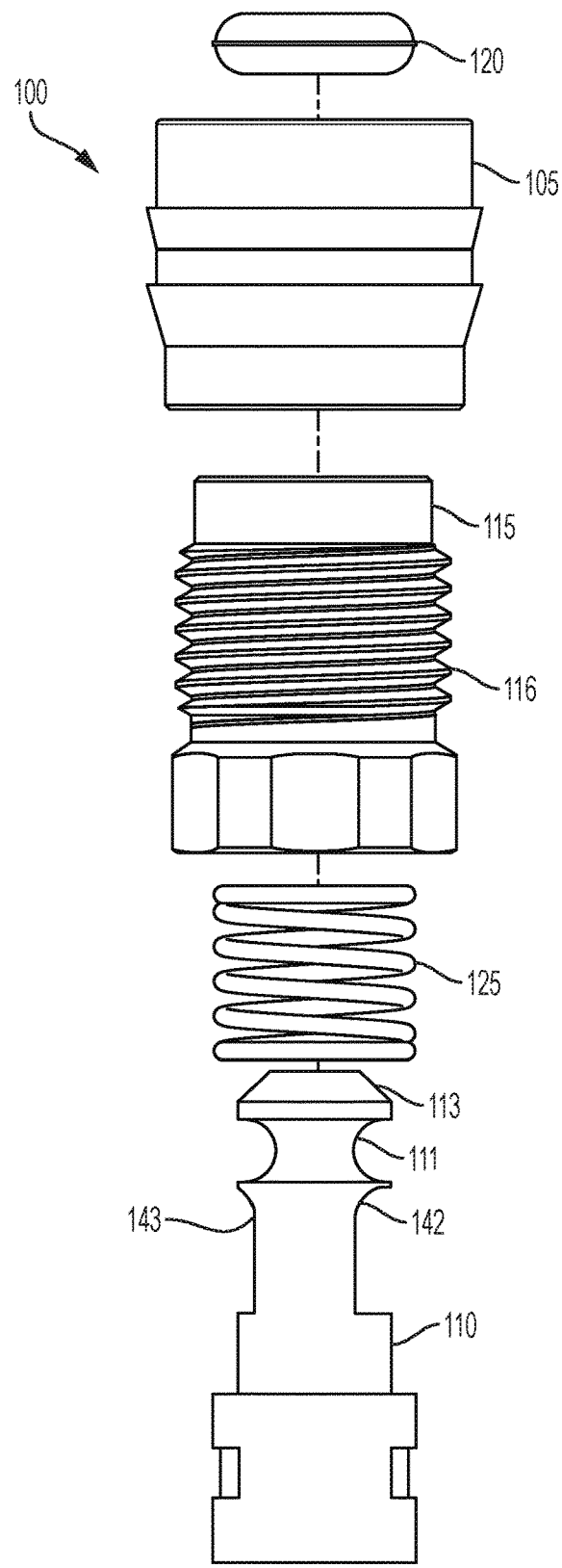

FIGS. 2A and 2B show an exploded view of pressure regulator 100 showing a front view and side view, respectively, of valve pin 110. The following components are visible in FIGS. 2A and 2B: valve housing 105, adjusting screw 115, biasing member 125, valve pin 110, and O-ring 120. O-ring groove 111 on valve pin head 113 is shown in a configuration in which O-ring 120 is unmated. FIG. 2B illustrates first discharge port 142 and second discharge port 143 positioned on front and back sides, respectively, of valve pin 110. Discharge ports 142 and 143 may be configured in a variety of patterns, including a single port, a double port (as shown in the illustrative embodiment in FIG. 2B), or multiple ports. In an illustrative embodiment, first discharge port 142 may be asymmetrically shaped relative to second discharge port 143. For example, first discharge port 142 may be cut more deeply into valve pin 110 than second discharge port 143, and may also have a more pronounced curvature on the top side. Without being bound by theory, the asymmetrically larger size of first discharge port 142 is believed to reduce pin vibration by increasing the rate of fluid flow from first discharge port 142 relative to second discharge port 143, thereby forcing valve pin 110 to the side of pressure regulator 100 proximate to second discharge port 143. This, in turn, is believed to reduce turbulence and noise created by the flow of fluid through pressure regulator 100.

According to the techniques herein, biasing member 125 may comprise any of a variety of biasing mechanisms such as, for example, a spring. Such a spring may be made of stainless steel, but it is contemplated within the scope of the disclosure that other spring materials that have suitable corrosion resistant properties with respect to the type of fuel being regulated by the fluid pressure regulator disclosed herein may also be used. In an exemplary embodiment, the spring may be a coil spring, but it may also be an elastomeric structure or a cantilevered or conical spring.

Valve pin 110 may be nickel plated brass, although it may be made from any metal, with appropriate anti-corrosive properties or coatings. Alternatively, it is contemplated within the scope of the disclosure that valve pin 110 may be made from a fuel grade plastic (e.g., FEP, TFE, PFA, ECTFE, ETFE, PVDF, etc.).

Figure 3:
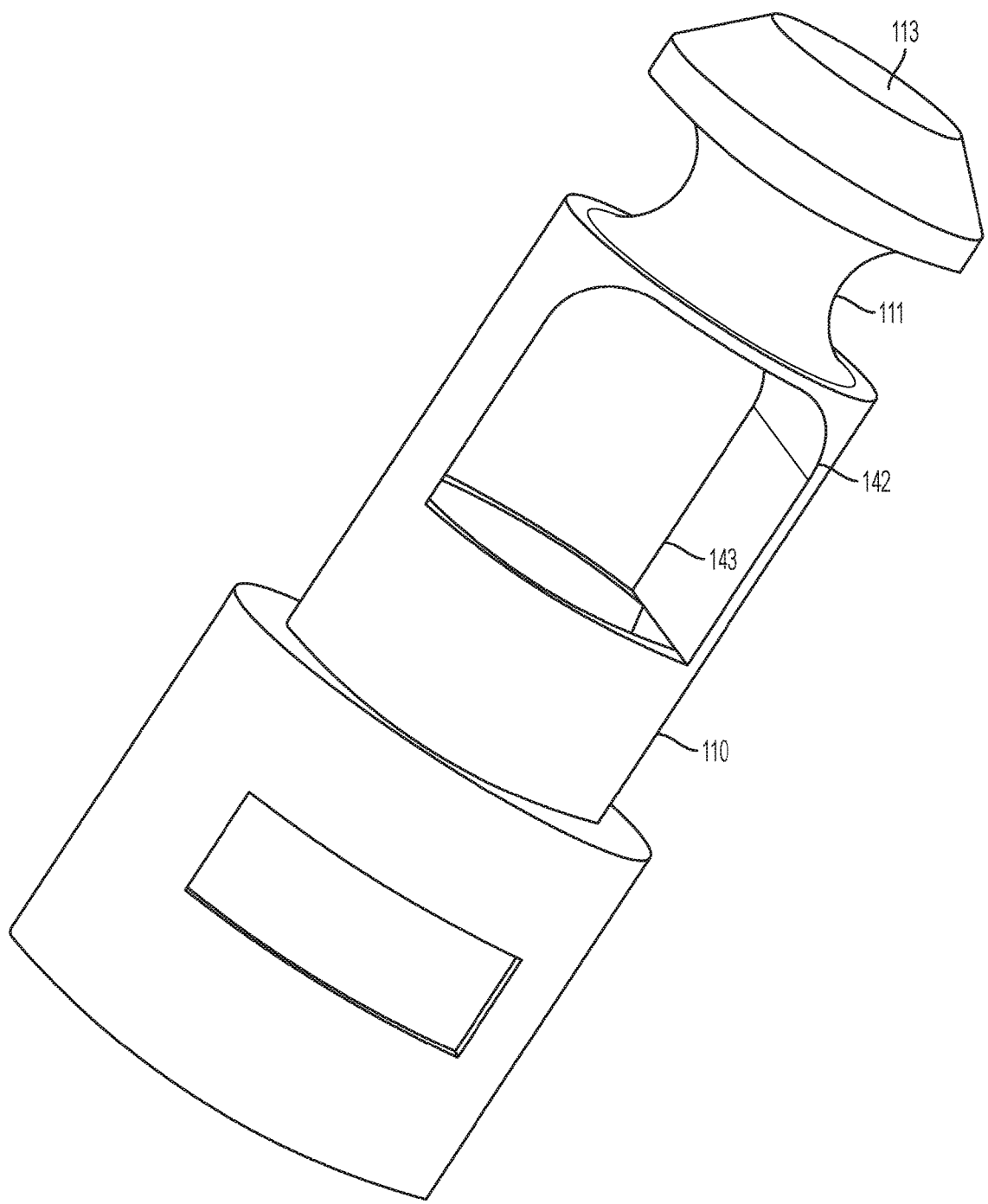
FIG. 3 shows a perspective view of a valve pin according to an exemplary embodiment of the disclosure.

FIG. 3 is a perspective view of valve pin 110 showing valve pin head 113, O-ring groove 111, first discharge port 142, second discharge port 143, and inset 144. In an exemplary embodiment, first discharge port 142 and second discharge port 143 may have a height of about 0.144 inches. Additionally an exemplary embodiment, first discharge port 142 may have a width of about 0.148 inches and second discharge port 143 may have a width of about 0.110 inches. It is contemplated within the scope of the disclosure that the size of valve pin 110, and concomitantly the size of first discharge port 142 and second discharge port 143 may be scaled up or down as desired.

Figure 4A:
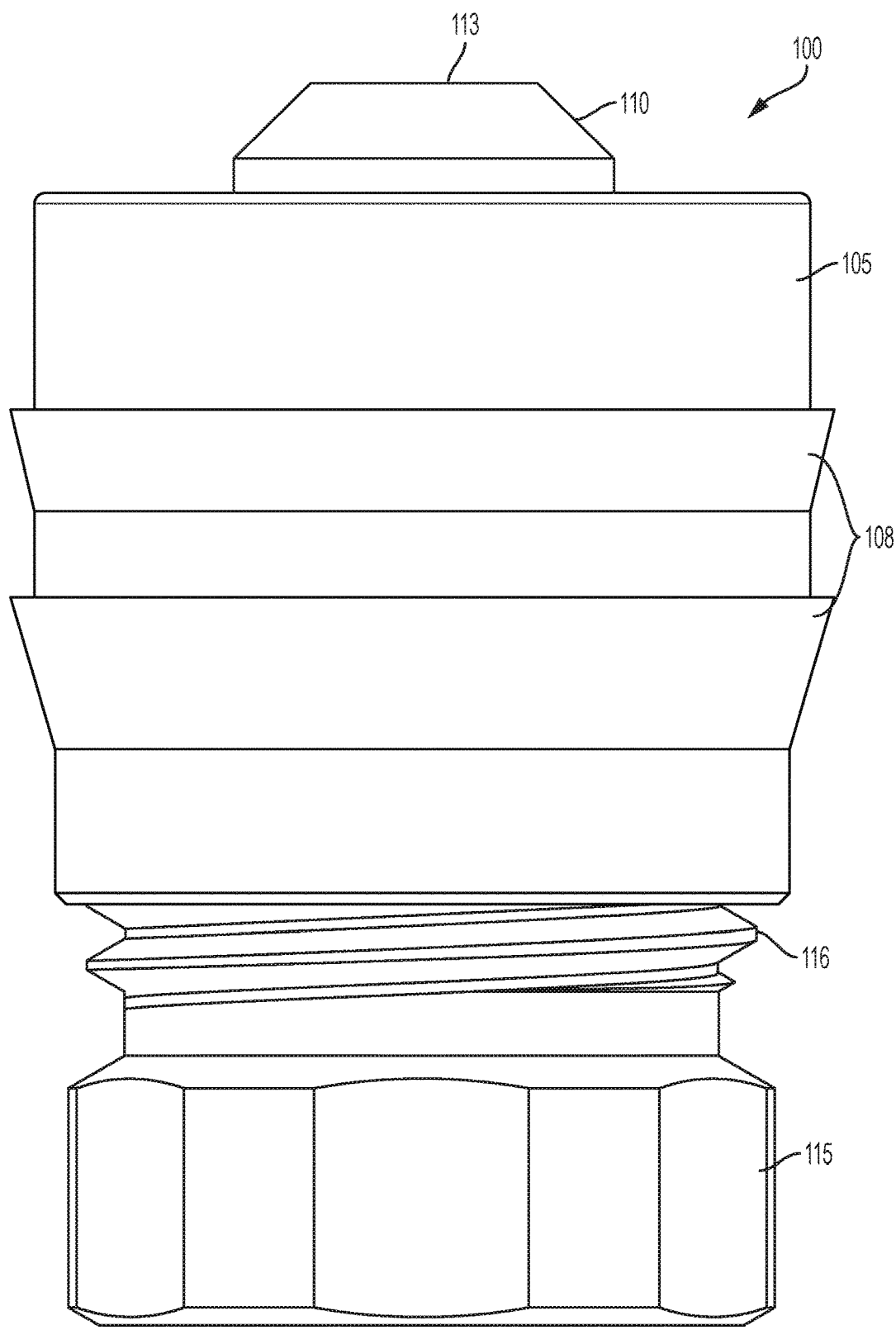
FIGS. 4A-4D show a front view, perspective view, top view, and bottom view of an assembled fluid pressure regulator according to an exemplary embodiment of the disclosure.
Figure 4B:
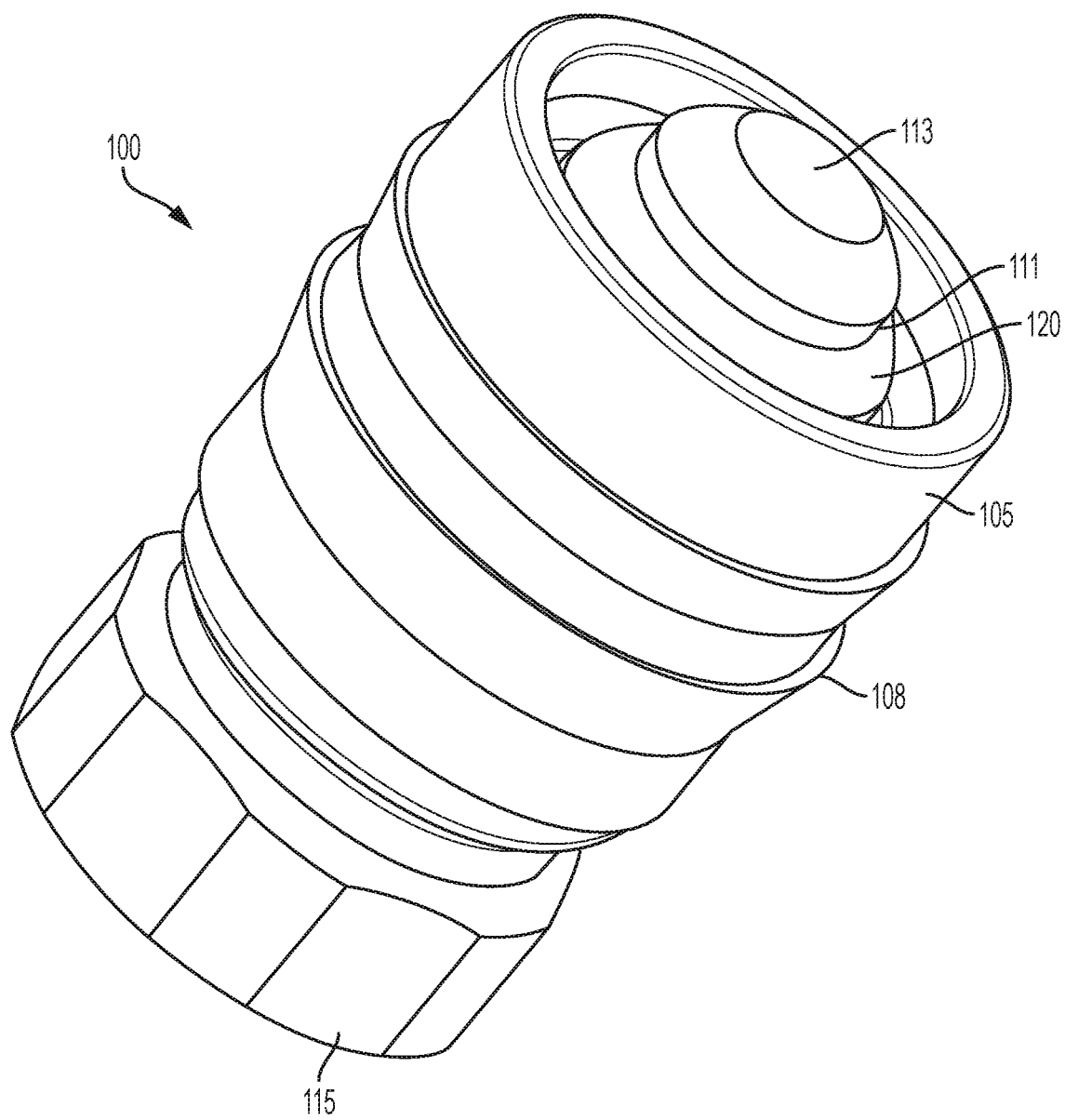
Figure 4C:
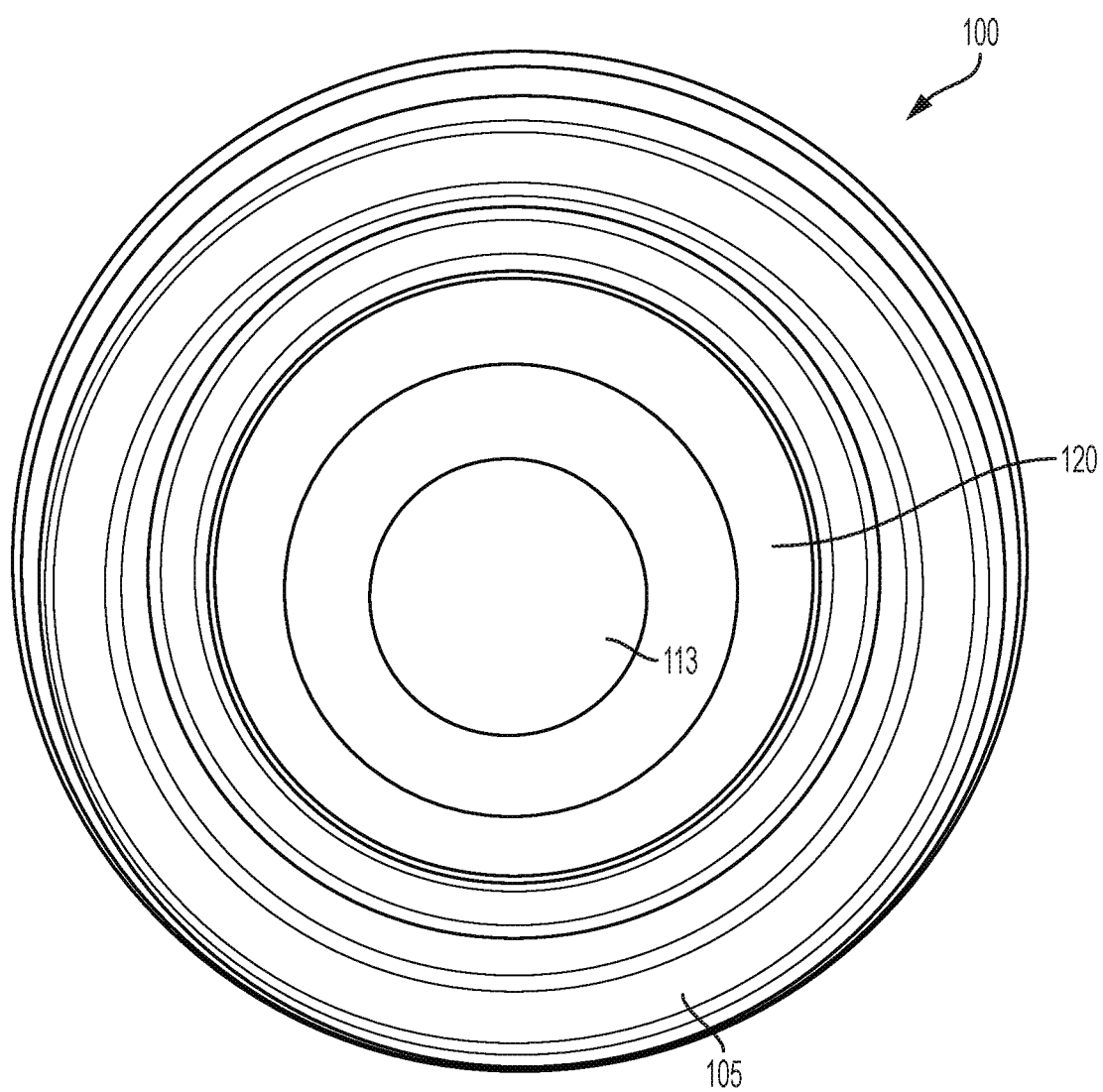
Figure 4D:
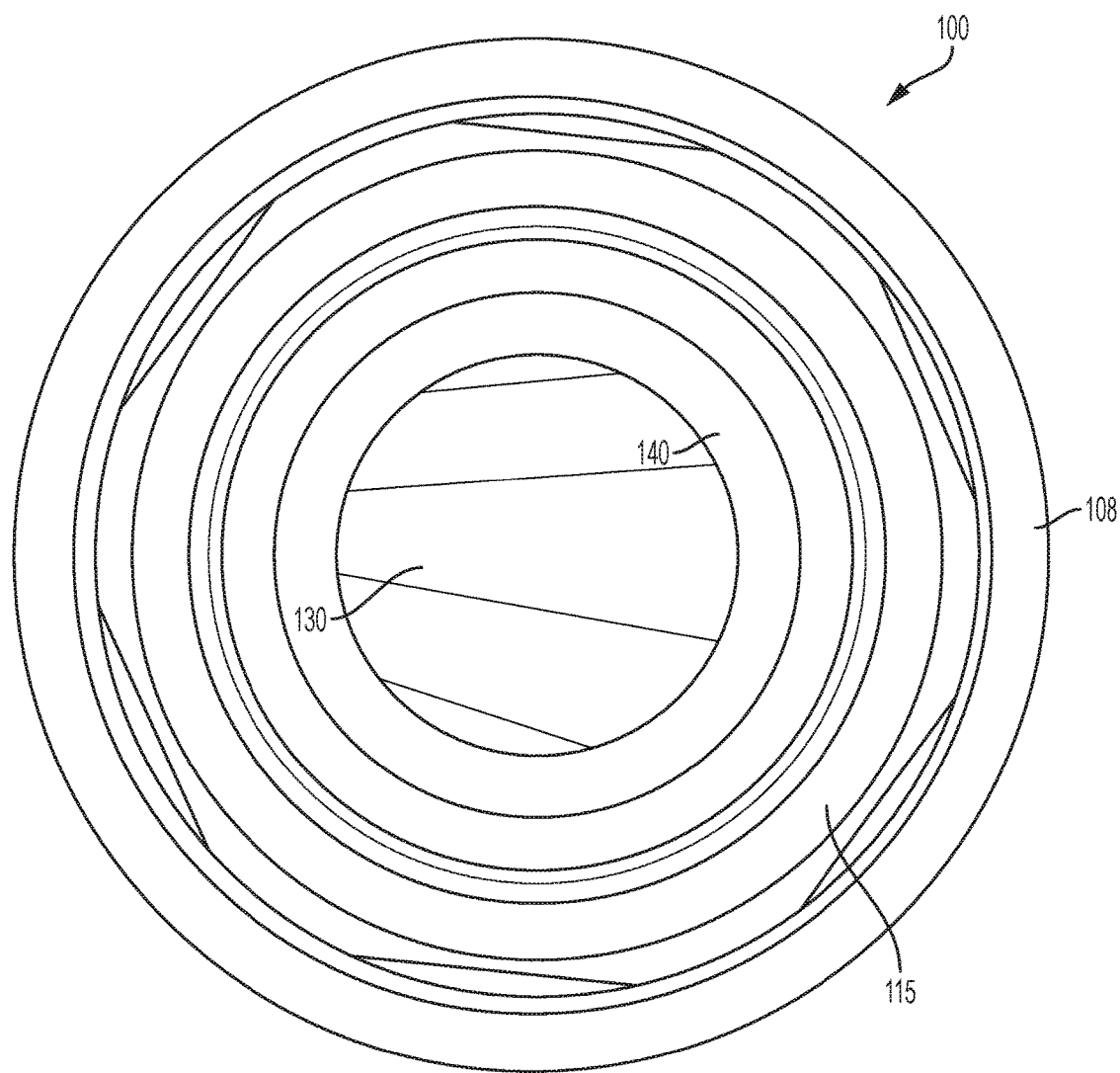

Referring now to FIGS. 4A-4D, an assembled pressure regulator according to an exemplary embodiment of the disclosure is shown in front, perspective, top, and bottom views. FIG. 4A shows a front view of an assembled pressure regulator in which valve pin head 113 is visible on the top of valve pin 110. Valve housing 105 may have one or more annular ridges 108. Adjusting screw 115 is shown mated to valve housing 105 via adjusting screw thread 116. FIG. 4B is a top front perspective view of an assembled pressure regulator in which O-ring 120 is seated on valve pin head 113 via O-ring groove 111. FIG. 4C is a top view of pressure regulator 100, again showing O-ring 120 seated on valve pin head 113. FIG. 4D is a bottom view of an assembled pressure regulator 100 showing inlet 140 and fluid passage 130.

Figure 5A:
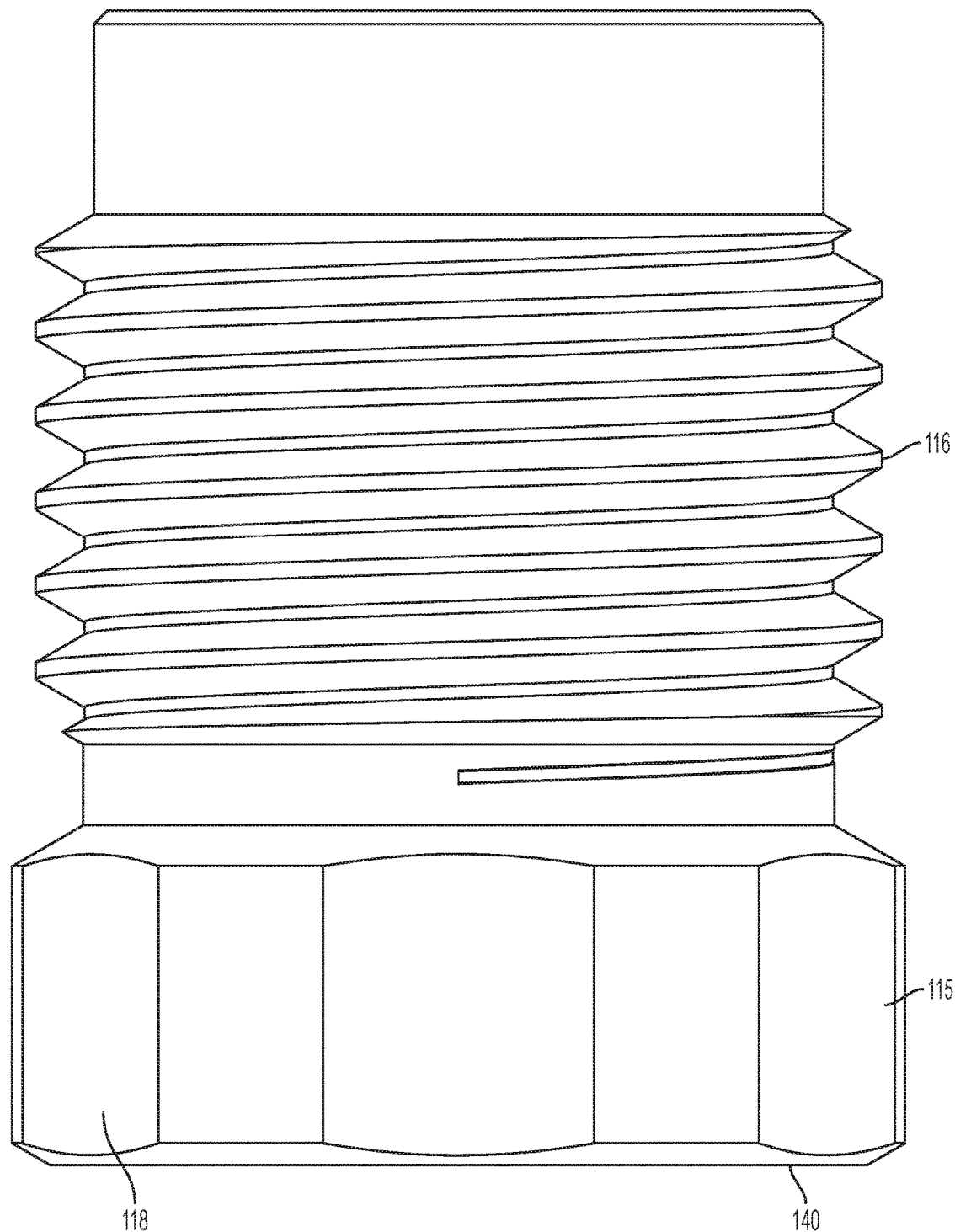
FIGS. 5A-5C show a front view, top perspective view, and bottom perspective view of an adjusting screw according to an exemplary embodiment of the disclosure.
Figure 5B:
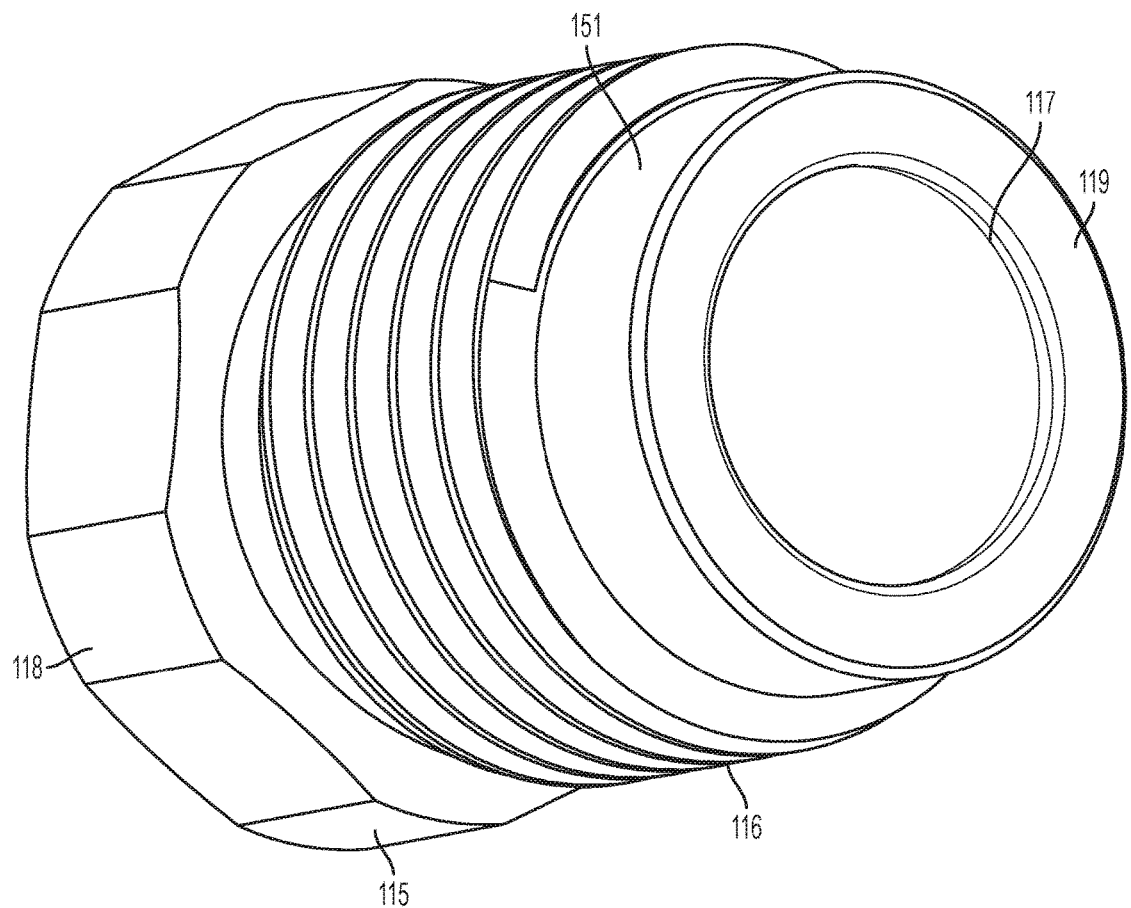
Figure 5C:
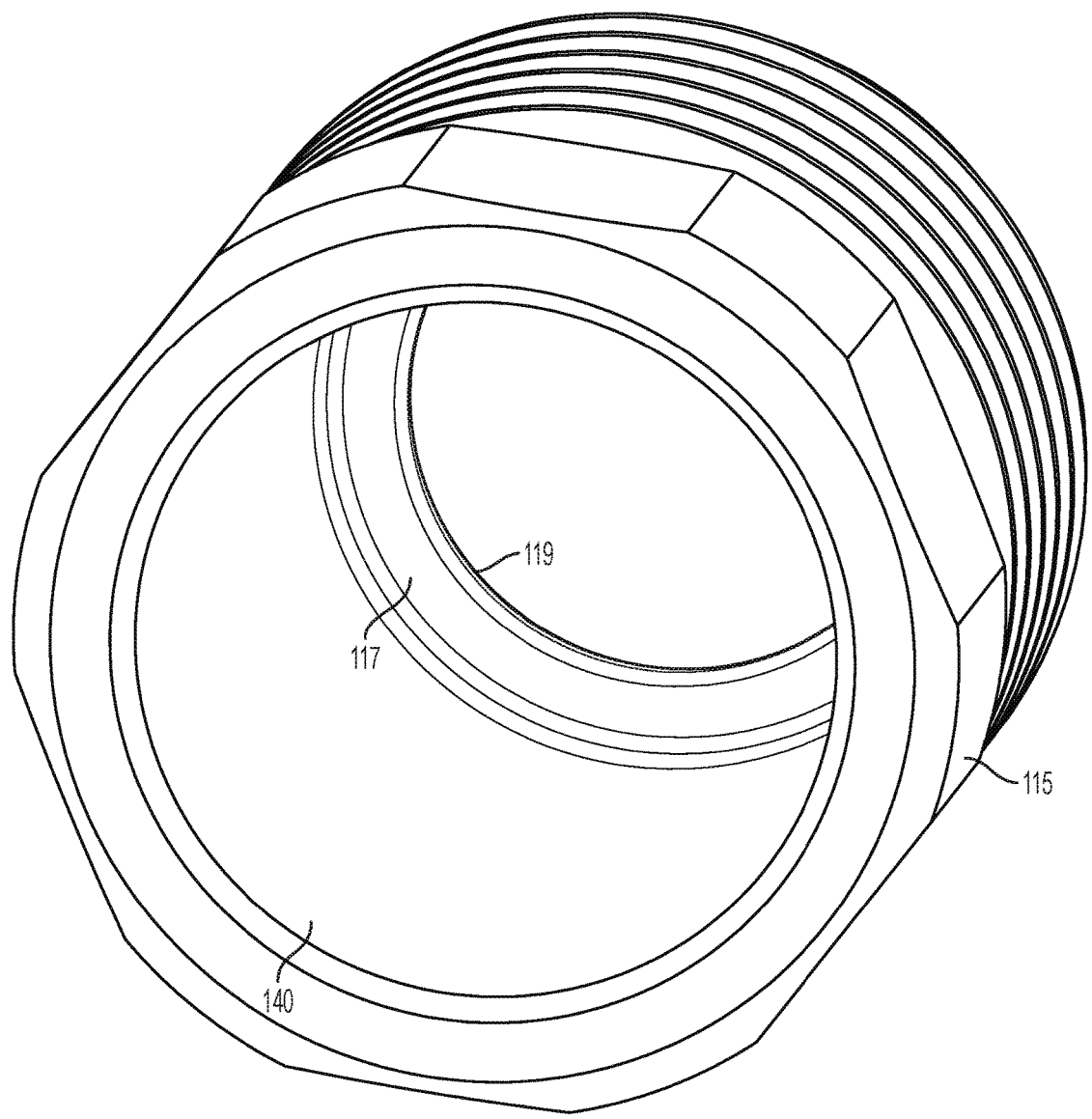

Referring now to FIGS. 5A-5C, an adjusting screw 115 according to an exemplary embodiment of the disclosure is shown in front, top perspective, and bottom perspective views, respectively. As shown in FIG. 5A, inlet 140 is located within bottom portion 118 of adjusting screw 115 and functions to allow fluid (e.g., fuel) to enter fluid passage 130 (see e.g., FIG. 1). FIG. 5B shows a top perspective view of adjusting screw 115, illustrating that adjusting screw thread 116 is positioned between bottom portion 118 and top portion 151. Additionally, top portion 151 includes circumferential rim 119, which serves as support for upper biasing member seat 117 located on the underside of rim 119. FIG. 5C is a bottom perspective view of adjusting screw 15 that highlights the location of upper biasing member seat 117 on the bottom side of rim 119. Adjusting screw 115 may be made of brass, or brass with a nickel coating. In other embodiments, adjusting screw 115 may be fabricated from almost any non-corrosive metal or other metal with an anti-corrosive coding or plating suitable for the type of fluid or fuel being handled by the fluid pressure regulator. Similarly, a plastic construction using moisture and fuel resistant plastics (e.g., FEP, TFE, PFA, ECTFE, ETFE, PVDF, etc.) may also be used.

Figure 6A:
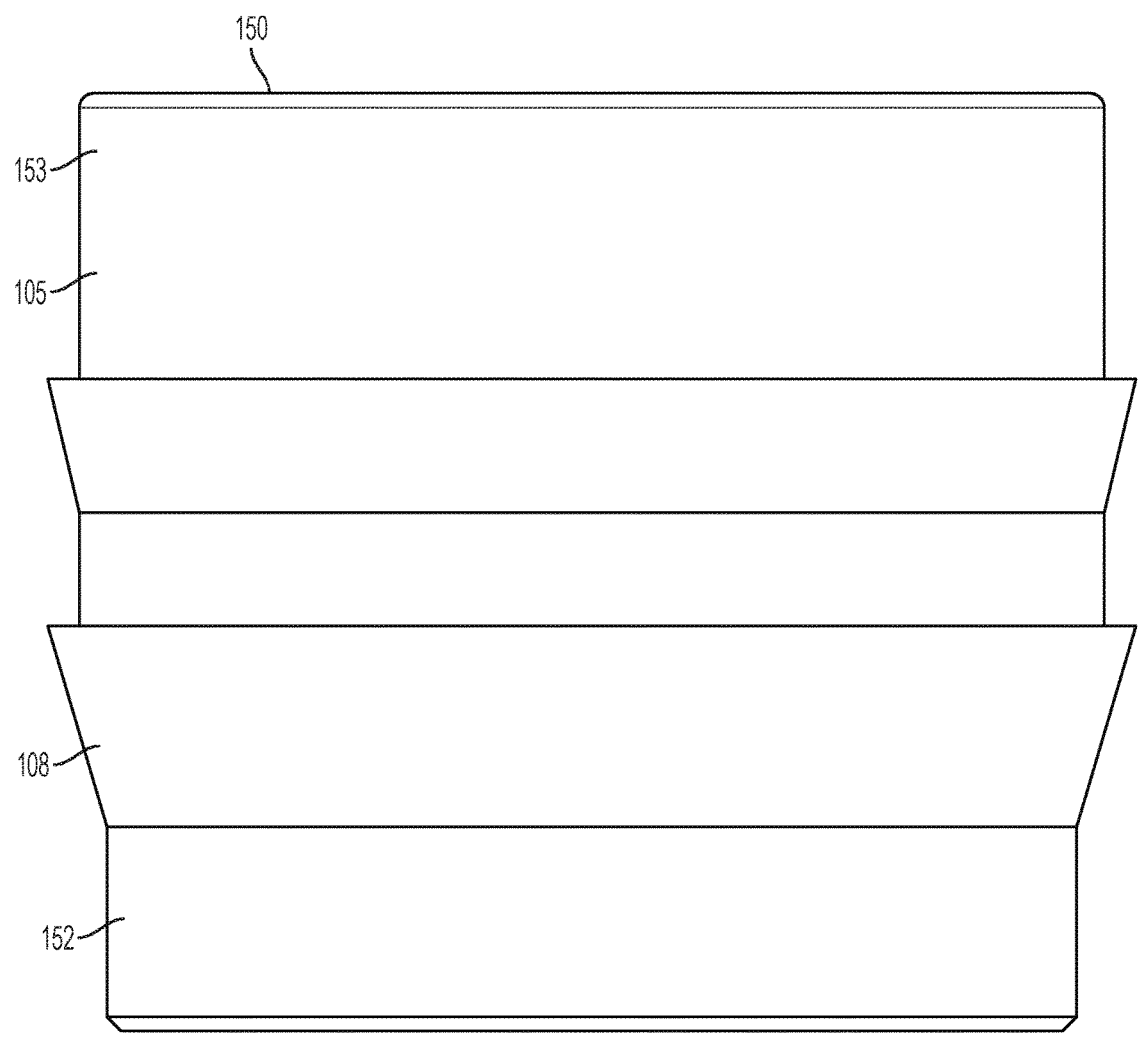
FIGS. 6A-6C show a front view, bottom perspective view, and partial cross-sectional view of a valve housing according to an exemplary embodiment of the disclosure.
Figure 6B:
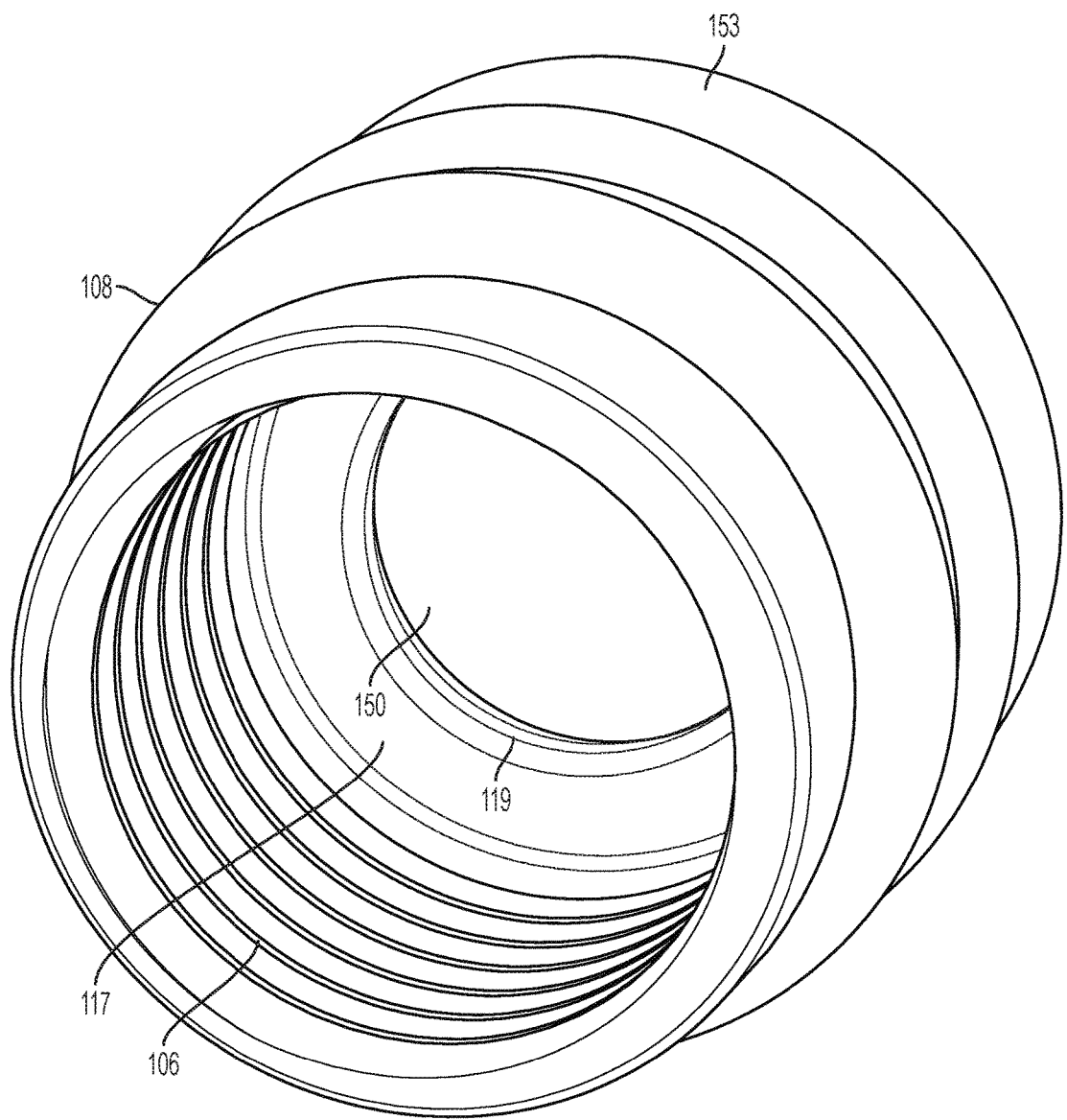
Figure 6C:
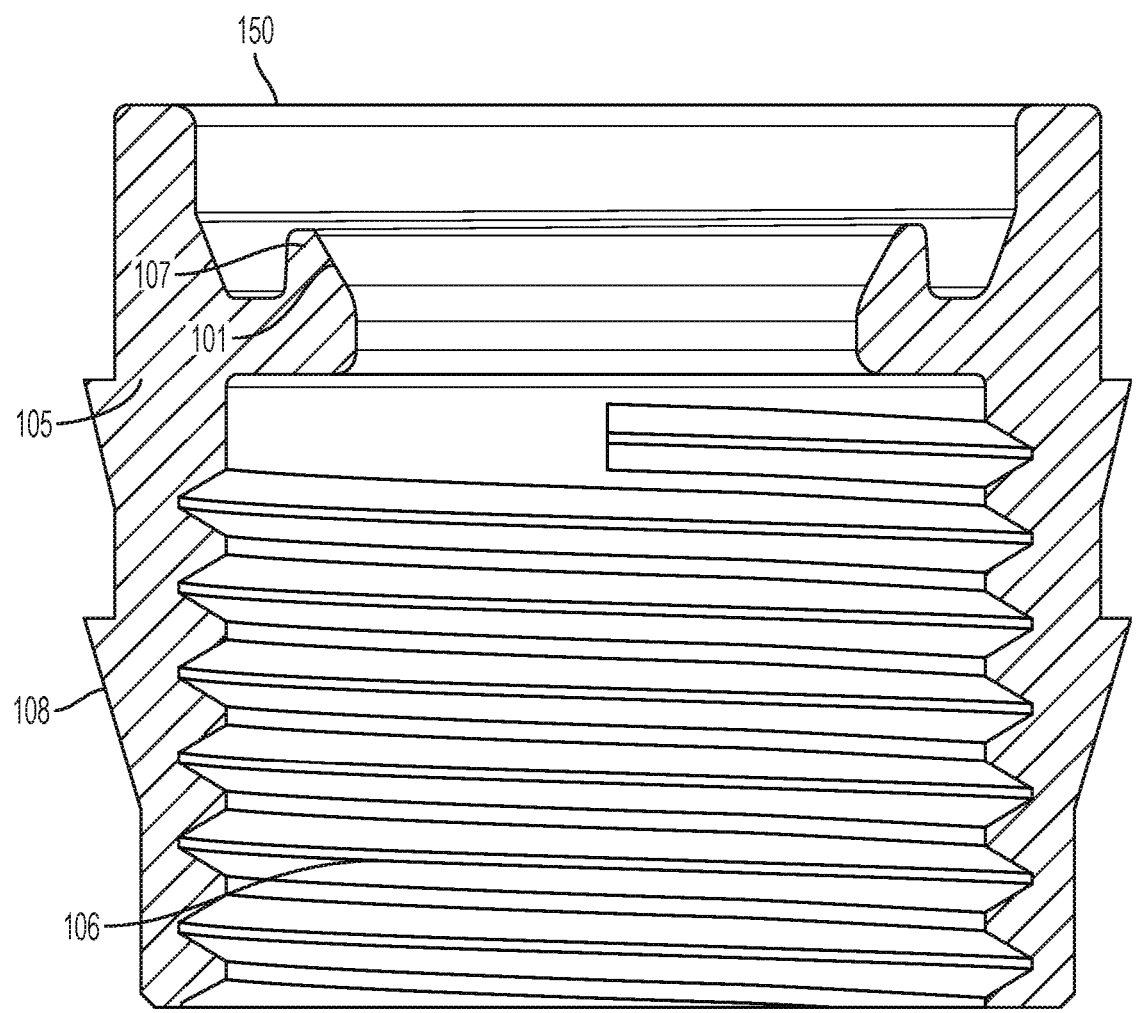

FIGS. 6A-6C depict several views of valve housing 105. In particular, FIG. 6A shows a front view of valve housing 105 having a lower portion 152 and an upper portion 153. One or more annular ridges 108 may optionally be circumferentially positioned around the outer surface of valve housing 105 between upper portion 153 and lower portion 152. Additionally, outlet 150 may be positioned proximal to upper portion 153. Adjusting screw 115 (not shown) may threadably mate with lower portion 152 of valve housing 105. FIG. 6B shows a bottom perspective view of valve housing 105 showing valve housing thread 106 which is configured to threadably mate with adjusting screw 115 (not shown). This view more clearly shows upper biasing member seat 117 as positioned on the underside of rim 119. FIG. 6C is a partial cross-sectional view of valve housing 105 that clearly shows the inner surface of valve seat 107 that functions to create seal 101 when brought into proximity with O-ring 120 (not shown).

Figure 7:
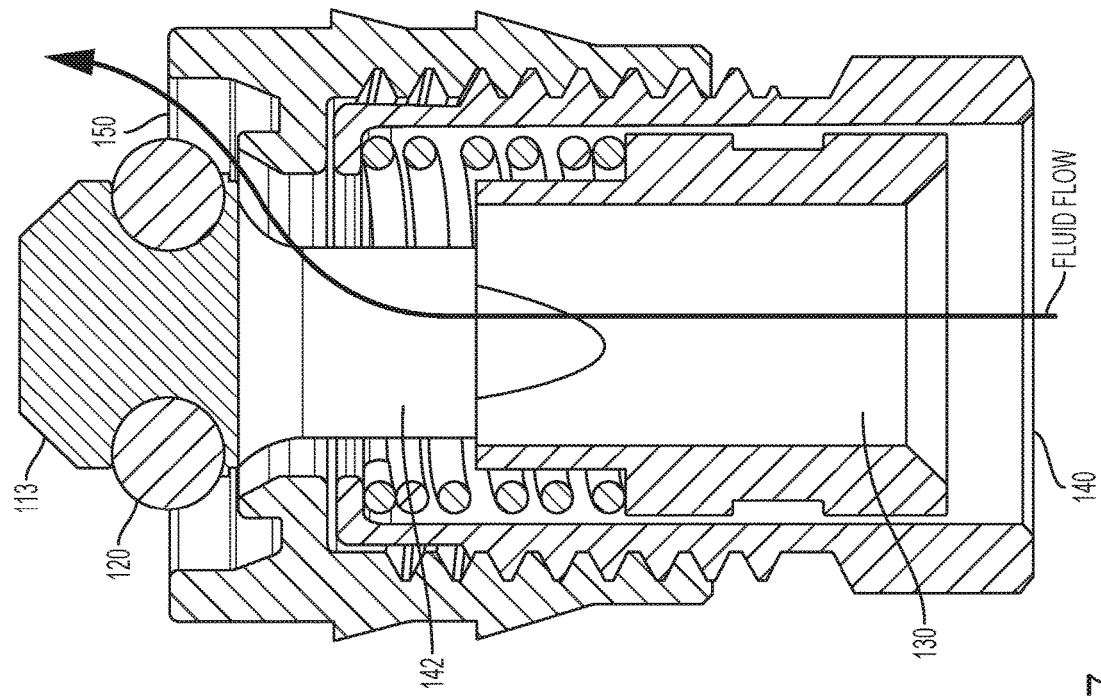
FIG. 7 shows a side-by-side comparison of the assembled fluid pressure regulator in cross-section in both the closed (left panel) and open (right panel) positions according to an exemplary embodiment of the disclosure.
Figure 7:
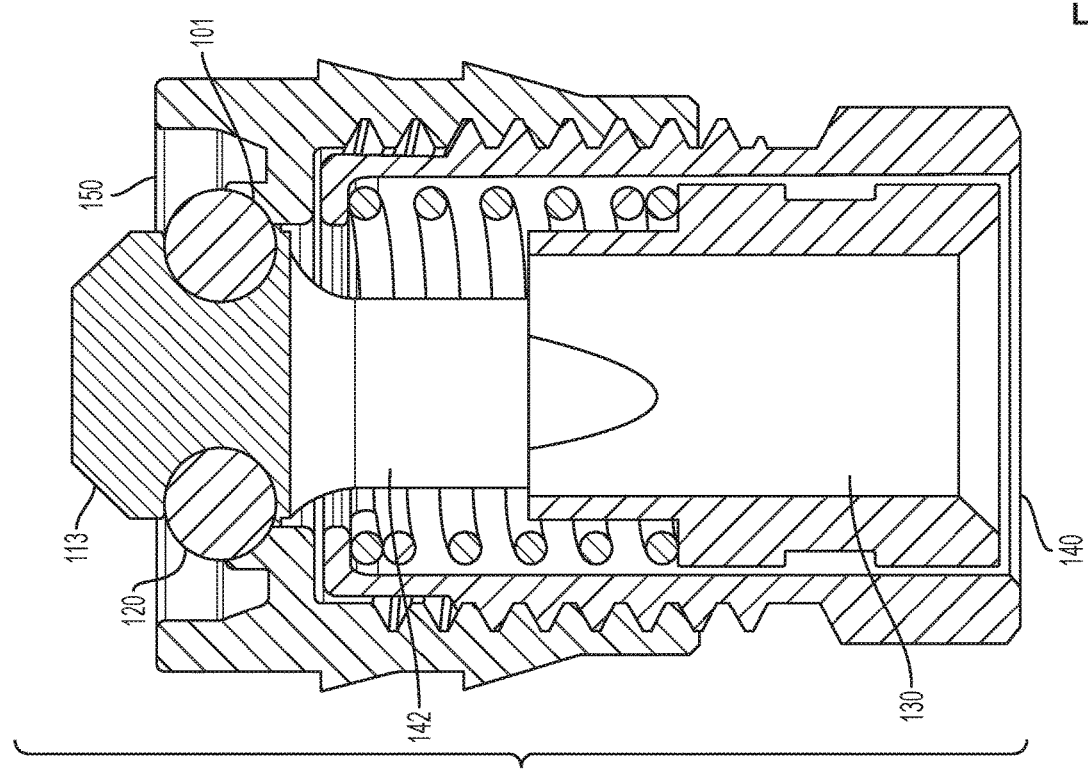
Figure 8A:
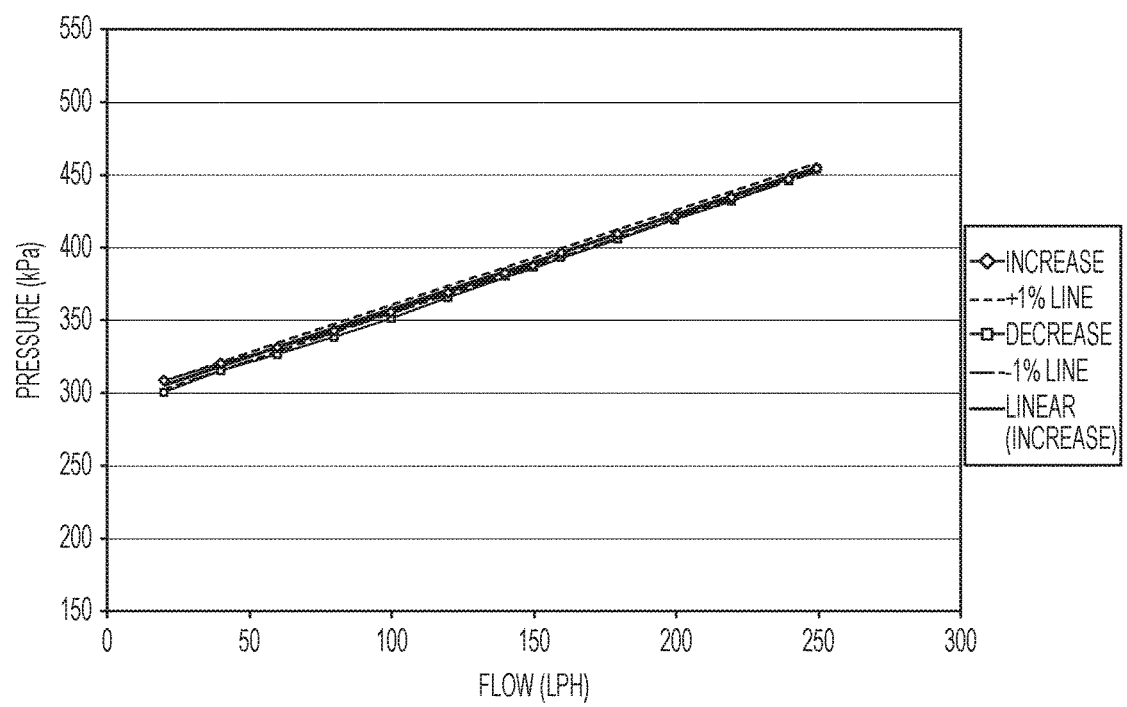
FIGS. 8A-8F show graphs depicting pressure vs. flow data for tested several fluid pressure regulators according to an exemplary embodiment of the disclosure.
Figure 8B:
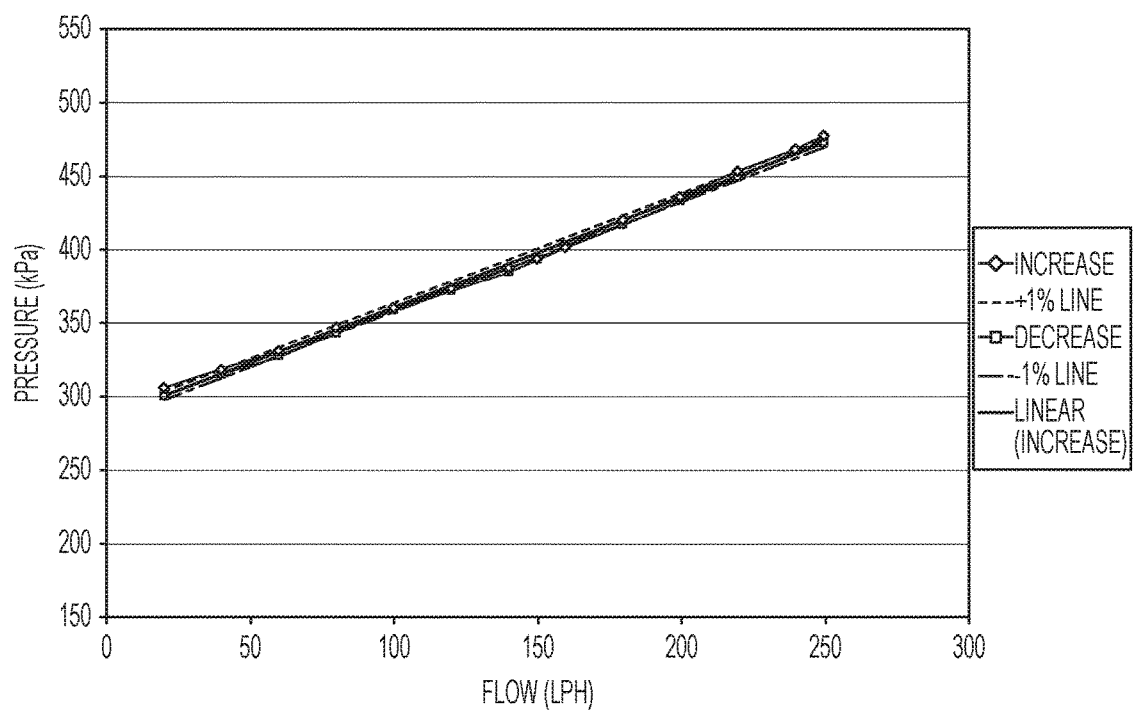
Figure 8C:
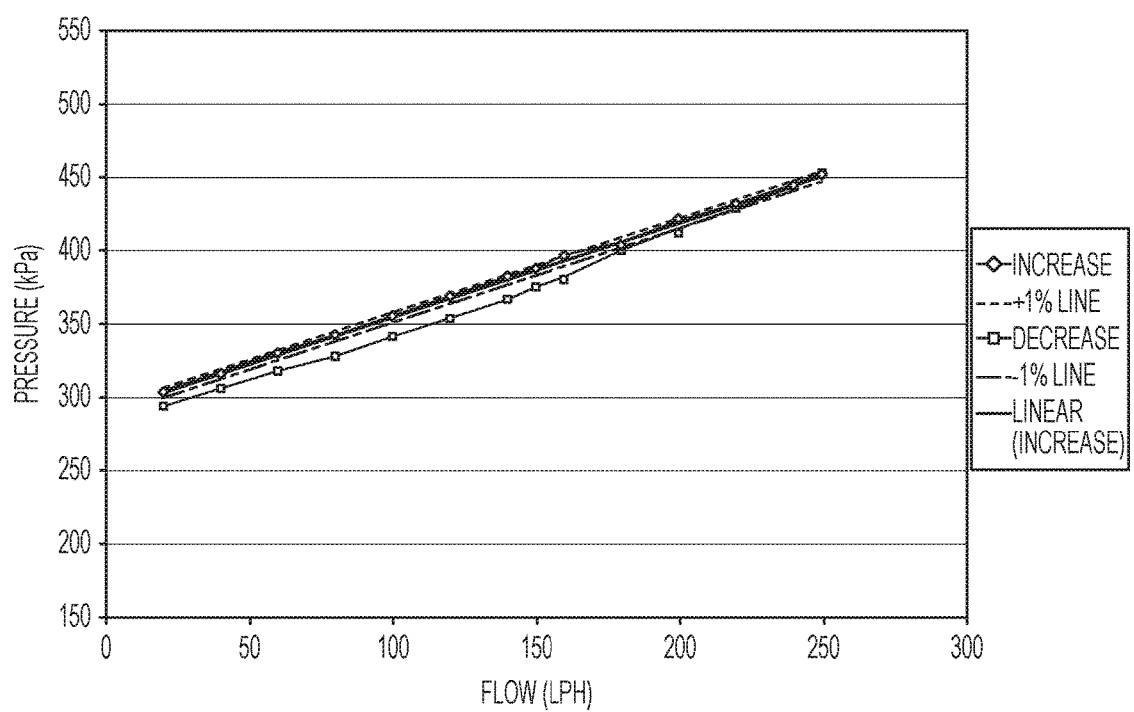
Figure 8D:
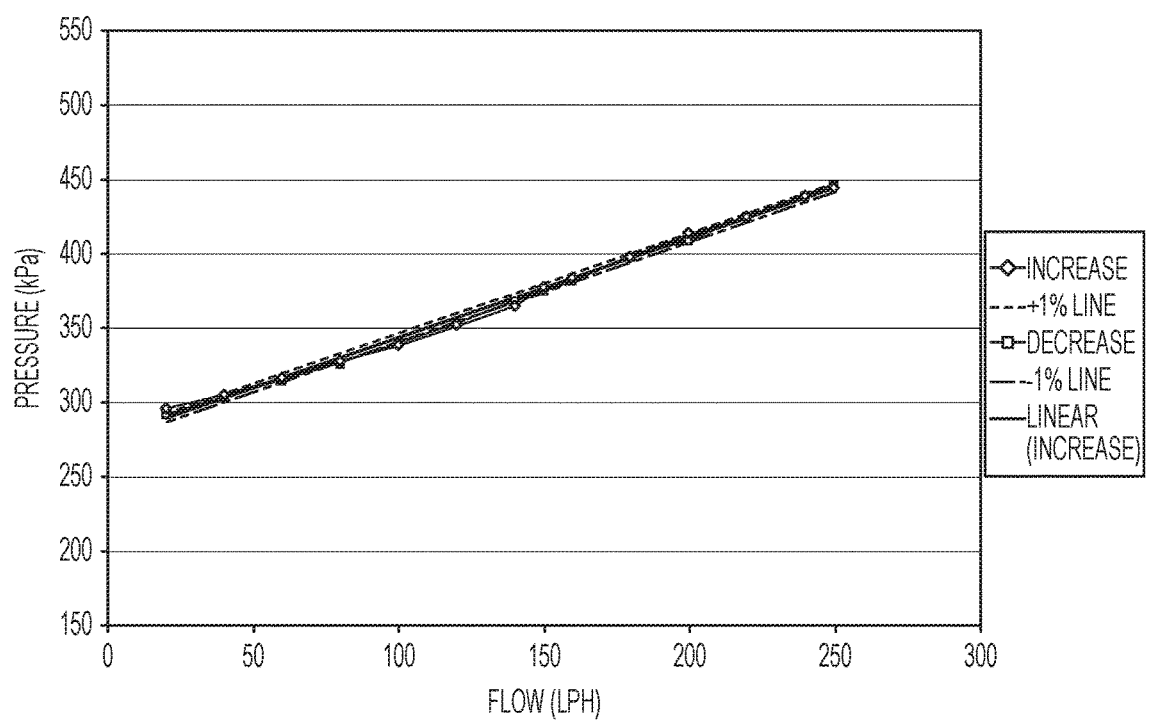
Figure 8E:
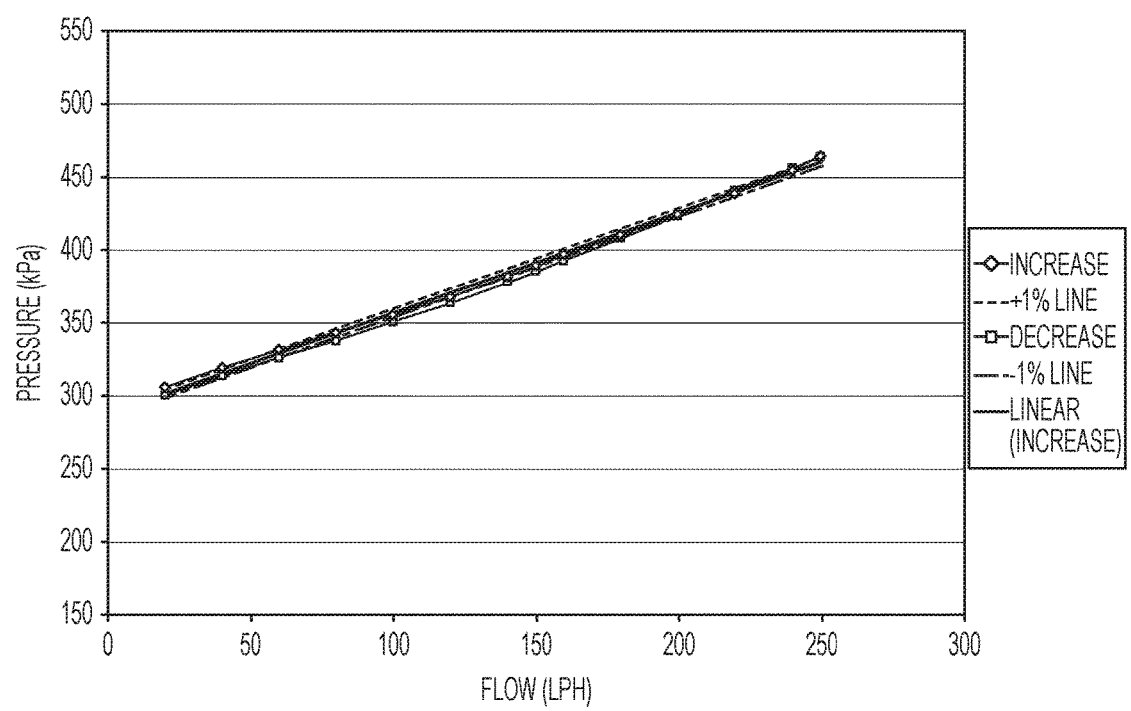
Figure 8F:
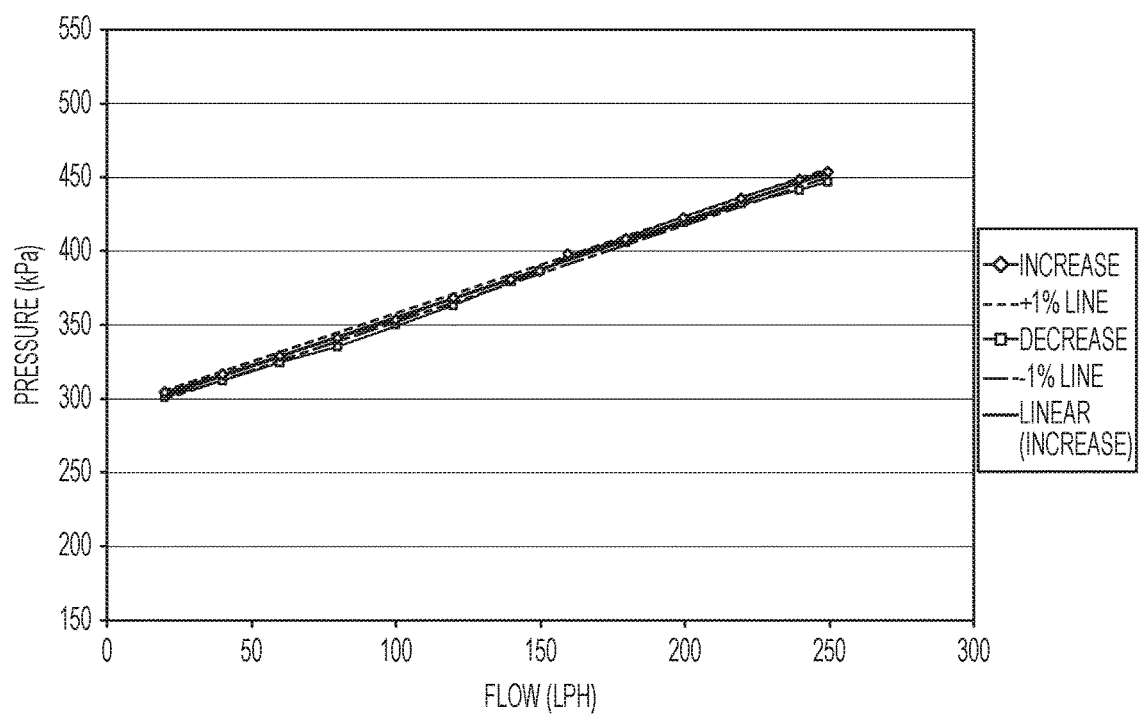

FIG. 7 shows side-by-side cross-sectional views of fluid pressure regulator 100 in the closed (left panel) and open (right panel) positions. The cross-sectional view of fluid pressure regulator 100 in the closed position is essentially the same as FIG. 1. As shown in FIG. 7, right panel, when the pressure of a fluid in fluid passage 130 exceeds the set point of fluid pressure regulator 100, biasing element 125 is compressed so that valve pin head 113 is raised up and away from valve seat 107 thereby breaking seal 101 and fluidly connecting inlet 140 with outlet 150 and creating a fluid flow (FIG. 7, arrow) between inlet 140 and outlet 150.

With respect to the ratio of pressure drop relative to fluid flow, the present disclosure provides a pressure regulation system with a lower pressure drop as the pressure regulator valve actuates anymore linear pressure drop-versus-flow relationship across the span of fluid flow rates through which the pressure regulator valve operates. For example, the present fluid flow regulator is able to maintain a lower pressure drop over the range of about 5 LPH to about 250 LPH.

Pressure and hysteresis data has been collected for six fluid pressure regulator test samples (R1-R6), which is displayed in Tables 1-6.

TABLE 1

R1 Data
R1
m = 0.6430
b = 293.4

| Flow LPH | increase pressure kPa | decrease pressure kPa | Hysterisis Percent | +1% line | −1% line | deviation % |
|---|---|---|---|---|---|---|
| 5 | 280.88 | 277.28 | 1.28% | 299.5 | 293.7 | −5.30% |
| 10 | 293.75 | 290.28 | 1.18% | 302.8 | 296.9 | −2.02% |
| 15 | 303.79 | 294.57 | 3.03% | 306.0 | 300.1 | 0.25% |
| 20 | 308.9 | 301.01 | 2.55% | 309.2 | 303.3 | 0.87% |
| 40 | 320.9 | 316.1 | 1.50% | 322.0 | 316.2 | 0.56% |
| 60 | 331.44 | 327.34 | 1.24% | 334.9 | 329.0 | −0.16% |
| 80 | 342.93 | 339.14 | 1.11% | 347.8 | 341.9 | −0.55% |
| 100 | 355.81 | 351.83 | 1.12% | 360.6 | 354.8 | −0.53% |
| 120 | 369.38 | 365.84 | 0.96% | 373.5 | 367.6 | −0.32% |
| 140 | 382.76 | 380.93 | 0.48% | 386.3 | 380.5 | −0.17% |
| 150 | 388.13 | 387.68 | 0.12% | 392.8 | 386.9 | −0.44% |
| 160 | 396.84 | 394.63 | 0.56% | 399.2 | 393.3 | 0.14% |
| 180 | 410.03 | 406.62 | 0.83% | 412.1 | 406.2 | 0.22% |
| 200 | 421.84 | 419.88 | 0.46% | 424.9 | 419.1 | −0.04% |
| 220 | 434.78 | 432.63 | 0.49% | 437.8 | 431.9 | −0.02% |
| 240 | 448.73 | 447.91 | 0.18% | 450.6 | 444.8 | 0.23% |
| 250 | 455.29 | 454.91 | 0.08% | 457.1 | 451.2 | 0.25% |
| Gain | 0.64 | | | | | |
| Min | | | 0.08% | | | 0.55% |
| Max | | | 2.55% | | | 0.87% |
| Abs max | | | 2.55% | | | 0.87% |
| Micro level | 262.565 | | | | | |

TABLE 2

R2 Data
R2
m = 0.7509
b = 285.4

| Flow LPH | increase pressure kPa | decrease pressure kPa | Hysterisis Percent | +1% line | −1% line | deviation % |
|---|---|---|---|---|---|---|
| 5 | 279.55 | 287.12 | −2.71% | 292.0 | 286.3 | −3.31% |
| 10 | 288.7 | 293.82 | −1.77% | 295.7 | 290.0 | −1.43% |
| 15 | 297.29 | 297.54 | −0.08% | 299.5 | 293.8 | 0.22% |
| 20 | 302.21 | 303.85 | −0.54% | 303.2 | 297.5 | 0.60% |
| 40 | 319.07 | 317.43 | 0.51% | 318.3 | 312.6 | 1.16% |

TABLE 2-continued

R2 Data
R2
m = 0.7509
b = 285.4

| Flow LPH | increase pressure kPa | decrease pressure kPa | Hysterisis Percent | +1% line | −1% line | deviation % |
|---|---|---|---|---|---|---|
| 60 | 331.63 | 330.49 | 0.34% | 333.3 | 327.6 | 0.36% |
| 80 | 345.39 | 345.45 | −0.02% | 348.3 | 342.6 | −0.02% |
| 100 | 359.47 | 359.47 | 0.00% | 363.3 | 357.6 | −0.28% |
| 120 | 373.67 | 372.16 | 0.40% | 378.3 | 372.6 | −0.48% |
| 140 | 388.57 | 386.36 | 0.57% | 393.4 | 387.6 | −0.49% |
| 150 | 394 | 394 | 0.00% | 400.9 | 395.2 | −1.01% |
| 160 | 401.19 | 402.71 | −0.38% | 408.4 | 402.7 | −1.07% |
| 180 | 418.68 | 418.93 | −0.06% | 423.4 | 417.7 | −0.44% |
| 200 | 435.79 | 434.97 | 0.19% | 438.4 | 432.7 | 0.05% |
| 220 | 453.02 | 450.18 | 0.63% | 453.4 | 447.7 | 0.54% |
| 240 | 468.3 | 468.11 | 0.04% | 468.4 | 462.7 | 0.58% |
| 250 | 476 | 473.41 | 0.54% | 475.9 | 470.2 | 0.61% |
| Gain | 0.76 | | | | | |
| Min | | | 0.54% | | | 1.07% |
| Max | | | 0.63% | | | 1.16% |
| Abs max | | | 0.63% | | | 1.16% |
| Micro level | 256.8785 | | | | | |

TABLE 3

R3 Data
R3
m = 0.6415
b = 291.0

| Flow LPH | increase pressure kPa | decrease pressure kPa | Hysterisis Percent | +1% line | −1% line | deviation % |
|---|---|---|---|---|---|---|
| 5 | 270.4 | 257.77 | 4.67% | 297.1 | 291.2 | −8.08% |
| 10 | 292.81 | 269.13 | 8.09% | 300.3 | 294.5 | −1.53% |
| 15 | 293.69 | 278.54 | 5.16% | 303.5 | 297.7 | −2.29% |
| 20 | 304.11 | 293.78 | 3.40% | 306.7 | 300.9 | 0.11% |
| 40 | 316.04 | 306.69 | 2.96% | 319.5 | 313.7 | −0.18% |
| 60 | 328.22 | 317.49 | 3.27% | 332.4 | 326.5 | −0.37% |
| 80 | 341.35 | 328.28 | 3.83% | 345.2 | 339.4 | −0.27% |
| 100 | 354.61 | 342.04 | 3.54% | 358.0 | 352.2 | −0.14% |
| 120 | 369.38 | 354.04 | 4.15% | 370.8 | 365.0 | 0.39% |
| 140 | 383.01 | 366.22 | 4.38% | 383.7 | 377.9 | 0.59% |
| 150 | 387.87 | 375.5 | 3.19% | 390.1 | 384.3 | 0.18% |
| 160 | 394.25 | 380.43 | 3.51% | 396.5 | 390.7 | 0.17% |
| 180 | 405.36 | 400.82 | 1.12% | 409.3 | 403.6 | −0.26% |
| 200 | 421.02 | 413.06 | 1.89% | 422.2 | 416.3 | 0.42% |
| 220 | 429.98 | 429.35 | 0.15% | 435.0 | 429.2 | −0.49% |
| 240 | 444.37 | 444.37 | 0.00% | 447.8 | 442.0 | −0.12% |
| 250 | 451.13 | 453.21 | −0.46% | 454.2 | 448.4 | −0.04% |
| Gain | 0.67 | | | | | |
| Min | | | 0.46% | | | 0.49% |
| Max | | | 4.38% | | | 0.59% |
| Abs max | | | 4.38% | | | 0.59% |
| Micro level | 258.4935 | | | | | |

TABLE 4

R4 Data
R4
m = 0.6789
b = 275.3

| Flow LPH | increase pressure kPa | decrease pressure kPa | Hysterisis Percent | +1% line | −1% line | deviation % |
|---|---|---|---|---|---|---|
| 5 | 282.9 | 282.39 | 0.18% | 281.4 | 275.9 | 1.52% |
| 10 | 286.11 | 286.05 | 0.02% | 284.8 | 279.3 | 1.43% |
| 15 | 291.04 | 290.09 | 0.33% | 288.2 | 282.7 | 1.95% |
| 20 | 294.64 | 290.91 | 1.27% | 291.6 | 286.1 | 2.00% |
| 40 | 304.61 | 303.98 | 0.21% | 305.2 | 299.7 | 0.72% |
| 60 | 316.73 | 314.9 | 0.58% | 318.8 | 313.3 | 0.23% |
| 80 | 326.58 | 325.82 | 0.23% | 332.3 | 326.8 | −0.91% |
| 100 | 338.51 | 339.14 | −0.19% | 345.9 | 340.4 | −1.36% |
| 120 | 353.28 | 352.9 | 0.11% | 359.5 | 354.0 | −0.97% |
| 140 | 365.21 | 368.75 | −0.97% | 373.1 | 367.6 | −1.38% |
| 150 | 377.21 | 376.2 | 0.27% | 379.9 | 374.4 | 0.03% |
| 160 | 384.59 | 383.14 | 0.38% | 386.7 | 381.1 | 0.18% |
| 180 | 398.1 | 398.42 | −0.08% | 400.2 | 394.7 | 0.16% |
| 200 | 414.07 | 409.65 | 1.07% | 413.8 | 408.3 | 0.73% |
| 220 | 425.25 | 425.5 | −0.06% | 427.4 | 421.9 | 0.15% |
| 240 | 439.57 | 439.26 | 0.07% | 441.0 | 435.5 | 0.31% |
| 250 | 446.14 | 446.77 | −0.14% | 447.7 | 442.2 | 0.26% |
| Gain | 0.66 | | | | | |
| Min | | | 0.97% | | | 1.38% |
| Max | | | 1.27% | | | 2.00% |
| Abs max | | | 1.27% | | | 2.00% |
| Micro level | 250.444 | | | | | |

TABLE 5

R5 Data
R5
m = 0.6897
b = 287.9

| Flow LPH | increase pressure kPa | decrease pressure kPa | Hysterisis Percent | +1% line | −1% line | deviation % |
|---|---|---|---|---|---|---|
| 5 | 291.67 | 290.22 | 0.50% | 294.2 | 288.5 | 0.11% |
| 10 | 299.69 | 297.29 | 0.80% | 297.7 | 291.9 | 1.66% |
| 15 | 301.9 | 299.43 | 0.82% | 301.1 | 295.4 | 1.23% |
| 20 | 305.3 | 300.63 | 1.53% | 304.6 | 298.8 | 1.20% |
| 40 | 318.69 | 314.21 | 1.41% | 318.4 | 312.6 | 1.02% |
| 60 | 331 | 326.52 | 1.35% | 332.1 | 326.4 | 0.53% |
| 80 | 341.98 | 338.19 | 1.11% | 345.9 | 340.2 | −0.32% |
| 100 | 354.54 | 351.32 | 0.91% | 359.7 | 354.0 | −0.65% |
| 120 | 367.42 | 364.27 | 0.86% | 373.5 | 367.8 | −0.87% |
| 140 | 382.13 | 379.42 | 0.71% | 387.3 | 381.6 | −0.60% |
| 150 | 388.63 | 386.8 | 0.47% | 394.2 | 388.5 | −0.69% |
| 160 | 396.14 | 393.62 | 0.64% | 401.1 | 395.4 | −0.53% |
| 180 | 409.27 | 409.08 | 0.05% | 414.9 | 409.1 | −0.67% |
| 200 | 425.25 | 425.94 | −0.16% | 428.7 | 422.9 | −0.13% |
| 220 | 440.33 | 442.23 | −0.43% | 442.5 | 436.7 | 0.16% |
| 240 | 456.43 | 457 | −0.12% | 456.3 | 450.5 | 0.67% |
| 250 | 465.08 | 465.08 | 0.00% | 463.2 | 457.4 | 1.04% |
| Gain | 0.69 | | | | | |
| Min | | | 0.43% | | | 0.87% |
| Max | | | 1.53% | | | 1.20% |
| Abs max | | | 1.53% | | | 1.20% |
| Micro level | 259.505 | | | | | |

TABLE 6

R6 Data
R6
m = 0.6628
b = 288.6

| Flow LPH | increase pressure kPa | decrease pressure kPa | Hysterisis Percent | +1% line | −1% line | deviation % |
|---|---|---|---|---|---|---|
| 5 | 294.45 | 294.38 | 0.02% | 294.8 | 289.0 | 0.87% |
| 10 | 300.38 | 297.41 | 0.99% | 298.1 | 292.3 | 1.75% |
| 15 | 302.02 | 300.82 | 0.40% | 301.4 | 295.6 | 1.17% |
| 20 | 303.6 | 302.46 | 0.38% | 304.7 | 299.0 | 0.58% |
| 40 | 315.03 | 312.44 | 0.82% | 318.0 | 312.2 | −0.02% |
| 60 | 328.85 | 325.13 | 1.13% | 331.2 | 325.5 | 0.15% |
| 80 | 340.66 | 334.79 | 1.72% | 344.5 | 338.7 | −0.28% |
| 100 | 352.84 | 350.69 | 0.61% | 357.8 | 352.0 | −0.57% |
| 120 | 368.18 | 363.19 | 1.36% | 371.0 | 365.2 | 0.02% |
| 140 | 380.05 | 379.1 | 0.25% | 384.3 | 378.5 | −0.35% |
| 150 | 385.85 | 385.66 | 0.05% | 390.9 | 385.1 | −0.56% |
| 160 | 397.41 | 395.95 | 0.37% | 397.5 | 391.7 | 0.70% |
| 180 | 407.32 | 406.43 | 0.22% | 410.8 | 405.0 | −0.14% |
| 200 | 423.04 | 420.32 | 0.64% | 424.0 | 418.3 | 0.45% |
| 220 | 435.47 | 432.57 | 0.67% | 437.3 | 431.5 | 0.25% |
| 240 | 447.84 | 441.91 | 1.32% | 450.5 | 444.8 | 0.04% |
| 250 | 453.15 | 447.91 | 1.16% | 457.2 | 451.4 | −0.25% |
| Gain | 0.64 | | | | | |
| Min | | | 0.05% | | | 0.57% |
| Max | | | 1.72% | | | 0.70% |
| Abs max | | | 1.72% | | | 0.70% |
| Micro level | 258.06 | | | | | |

This data is summarized in Table 7.

TABLE 7

Summary

| Sample | 15-250 kPa/lph | set point kPa | Max Hyst. Percent | linear dev. Percent |
|---|---|---|---|---|
| R 1 | 0.64 | 309 | 2.6% | 0.9% |
| R 2 | 0.76 | 302 | 0.6% | 1.2% |
| R 3 | 0.67 | 304 | 4.4% | 0.6% |
| R 4 | 0.66 | 295 | 1.3% | 2.0% |
| R 5 | 0.69 | 305 | 1.5% | 1.2% |
| R 6 | 0.64 | 304 | 1.7% | 0.7% |
| Average | 0.68 | 303 | 2.0% | 1.1% |
| Min | 0.64 | 295 | 0.6% | 0.6% |
| Max | 0.76 | 309 | 4.4% | 2.0% |

The above tests were conducted with a target set point of about 300 kPa and a target flow rate of about 20 LPH. Advantageously, the reduced pressure drop improves the robustness of fuel injectors located downstream of the pressure regulator. Additionally, as shown in FIGS. 8A-8F, there is a linear relationship between the pressure drop and the fuel flow rate, which improves the effectiveness of the fuel injection control system by increasing the predictability of the pressure drop.

Reference will now be made in detail to exemplary embodiments of the disclosure. While the disclosure will be described in conjunction with the exemplary embodiments, it will be understood that it is not intended to limit the disclosure to those embodiments. To the contrary, it is intended to cover alternatives, modifications, and equivalents as may be included within the spirit and scope of the disclosure as defined by the appended claims.

FIGURE ELEMENTS

100: pressure regulator
101: seal
105: valve housing
106: valve housing thread
107: valve seat
108: annular ridge
110: valve pin
111: O-ring groove
112: lower spring seat
113: valve pin head
115: adjusting screw
116: adjusting screw thread
117: upper spring seat
118: bottom portion
119: rim
120: O-ring
124: bore
125: spring
126: $1^{st}$ spring end
127: $2^{nd}$ spring end
130: fluid passage
140: inlet
142: $1^{st}$ discharge port
143: $2^{nd}$ discharge port
144: inset
150: outlet
151: top portion
152: lower portion
153: upper portion

INCORPORATION BY REFERENCE

All documents cited or referenced herein and all documents cited or referenced in the herein cited documents, together with any manufacturer's instructions, descriptions, product specifications, and product sheets for any products mentioned herein or in any document incorporated by reference herein, are hereby incorporated by reference, and may be employed in the practice of the disclosure.

EQUIVALENTS

It is understood that the detailed examples and embodiments described herein are given by way of example for illustrative purposes only, and are in no way considered to be limiting to the disclosure. Various modifications or changes in light thereof will be suggested to persons skilled in the art and are included within the spirit and purview of this application and are considered within the scope of the appended claims. Additional advantageous features and functionalities associated with the systems, methods, and processes of the present disclosure will be apparent from the appended claims. Moreover, those skilled in the art will recognize, or be able to ascertain using no more than routine experimentation, many equivalents to the specific embodiments of the disclosure described herein. Such equivalents are intended to be encompassed by the following claims.

What is claimed is:

1. A fluid pressure regulator, comprising:
   a regulator body including a housing member and an adjusting member, the housing member including a lower end and an upper end having a raised annular valve seat surrounding a fluid outlet, and the adjusting member having a lower end and an upper end configured to adjustably mate with the lower end of the housing member;
   a pin axially disposed within the regulator body, the pin including an upper end having a circumferential groove, a lower end having a fluid inlet, one or more fluid discharge ports, and a fluid passageway connecting the fluid inlet to the one or more fluid discharge ports;

an elastomeric O-ring conformingly positioned within the circumferential groove on the upper end of the pin, wherein the elastomeric O-ring contacts the raised annular valve seat when the fluid pressure regulator is closed; and a biasing member coupled to the pin and configured to maintain the elastomeric O-ring in contact with the raised annular valve seat and to control an opening pressure of the fluid pressure regulator.

2. The fluid pressure regulator of claim 1, wherein the one or more fluid discharge ports are positioned proximal to the circumferential groove on the pin.

3. The fluid pressure regulator of claim 1, wherein the one or more fluid discharge ports are a first discharge port and a second discharge port.

4. The fluid pressure regulator of claim 3, wherein the first discharge port is positioned on the side of the pin opposite from the second discharge port.

5. The fluid pressure regulator of claim 3, wherein the first discharge port provides a larger aperture than the second discharge port.

6. The fluid pressure regulator of claim 1, wherein the fluid outlet is centrally positioned on the upper end of the housing member.

7. The fluid pressure regulator of claim 1, wherein the biasing member comprises a spring having a first end and a second end, the first end configured to contact an annular seat on the upper end of the adjusting member and the second end configured to contact an annular shelf on the pin.

8. The fluid pressure regulator of claim 1, wherein the elastomeric O-ring has a radius ranging from about 0.68 inches to about 0.74 inches.

9. The fluid pressure regulator of claim 1, wherein the elastomeric O-ring is made of a fluoroelastomer or any elastomer that is compatible with the fuel being handled may be used.

10. The fluid pressure regulator of claim 1, wherein the upper and of the adjusting member includes an external threaded surface configured to mate with an internal threaded surface of the lower end of the housing member.

11. The fluid pressure regulator of claim 10, wherein the opening pressure of the fluid pressure regulator is changed by rotating the adjusting member clockwise or counterclockwise relative to the housing member.

12. The fluid pressure regulator of claim 1, wherein a fluid in the fluid passageway is at a pressure ranging from about 15 to about 200 L per hour.

13. The fluid pressure regulator of claim 1, wherein the housing member is made of a material selected from the group consisting of brass, NP, and stainless steel, and the adjusting member is made of a material selected from the group consisting of brass, NP, and stainless steel.

14. The fluid pressure regulator of claim 1, wherein the fluid pressure regulator regulates the pressure of a fluid selected from the group consisting of ethanol, methanol, gasoline, diesel, biodiesel, and mixtures thereof.

* * * * *